United States Patent
Cance et al.

(10) Patent No.: US 12,072,908 B2
(45) Date of Patent: Aug. 27, 2024

(54) METHOD AND APPARATUS FOR RAPIDLY SYNCHRONIZING A REPLICATE STORAGE SYSTEM WITH AN ACTIVE STORAGE SYSTEM

(71) Applicant: SCALITY, S.A., Paris (FR)

(72) Inventors: Stéphane Cance, Montreuil (FR); Viet Tuan Nguyen, Bussy-Saint-Georges (FR); Romain Vaillant, Paris (FR); Boris Faure, Courbevoie (FR); Florent Monjalet, Paris (FR); Oliver Garaud, Sèvres (FR)

(73) Assignee: Scality, S.A., Paris (FR)

( * ) Notice: Subject to any disclaimer, the term of this patent is extended or adjusted under 35 U.S.C. 154(b) by 114 days.

(21) Appl. No.: 17/535,895

(22) Filed: Nov. 26, 2021

(65) Prior Publication Data

US 2023/0169091 A1 Jun. 1, 2023

(51) Int. Cl.
*G06F 16/27* (2019.01)
(52) U.S. Cl.
CPC ................... *G06F 16/27* (2019.01)
(58) Field of Classification Search
CPC ........................................ G06F 16/27
USPC .......................................... 707/625
See application file for complete search history.

(56) References Cited

U.S. PATENT DOCUMENTS

| | | |
|---|---|---|
| 9,524,302 B2 | 12/2016 | Regni et al. |
| 9,990,156 B1 | 6/2018 | Kandamuthan |
| 2012/0150826 A1 | 6/2012 | Vijayan Retnamma et al. |
| 2012/0150829 A1* | 6/2012 | Bourbonnais ......... G06F 16/273 707/703 |
| 2013/0138616 A1* | 5/2013 | Gupta ................. G06F 11/1471 707/690 |
| 2016/0182633 A1* | 6/2016 | Grebnov ................. G06F 16/27 709/219 |
| 2018/0046385 A1 | 2/2018 | Altaparmakov |
| 2019/0236081 A1* | 8/2019 | Park ....................... G06F 16/951 |

(Continued)

FOREIGN PATENT DOCUMENTS

| | | |
|---|---|---|
| JP | 2021532465 A | 11/2021 |
| KR | 20120044694 A | 5/2012 |
| KR | 20140042430 A | 4/2014 |

OTHER PUBLICATIONS

International Search Report and Written Opinion for PCT Patent Application No. PCT/US22/51008, Mailed Mar. 27, 2023, 9 pages.

*Primary Examiner* — Michael Pham
(74) *Attorney, Agent, or Firm* — Compass IP Law PC

(57) ABSTRACT

A method is described. The method includes queuing an entry in a queue that identifies an inode that has been changed in an active storage system. The entry further describes a time in the future. The method includes processing the entry upon the time in the future being reached. The processing of the entry includes comparing respective content values maintained for different regions of the inode within the active storage system and a replicate storage system. The method further includes comparing content of those of the regions having different content values as between the active storage system and the replicate storage system. The method further includes updating those regions in the replicate storage system to reflect those regions within the active storage system based on the comparing, and, updating the respective content values of those regions in the replicate storage system.

33 Claims, 21 Drawing Sheets

---

Queuing an entry in a queue that identifies an inode that has been changed in an active storage system, where, the entry further describes a time in the future 301

↓

Processing the entry upon the time in the future being reached, the processing of the entry including comparing respective content values maintained for different regions of the inode within the active storage system and a replicate storage system 302

↓

Comparing content of those of the regions having different content values as between the active storage system and the replicate storage system 303

↓

Updating those regions in the replicate storage system to reflect those regions within the active storage system based on the comparing, and, updating the respective content values of those regions in the replicate storage system 304

(56) References Cited

U.S. PATENT DOCUMENTS

2021/0303594 A1 9/2021 Puvvada et al.
2021/0326359 A1* 10/2021 Upton .................... G06F 3/067

* cited by examiner

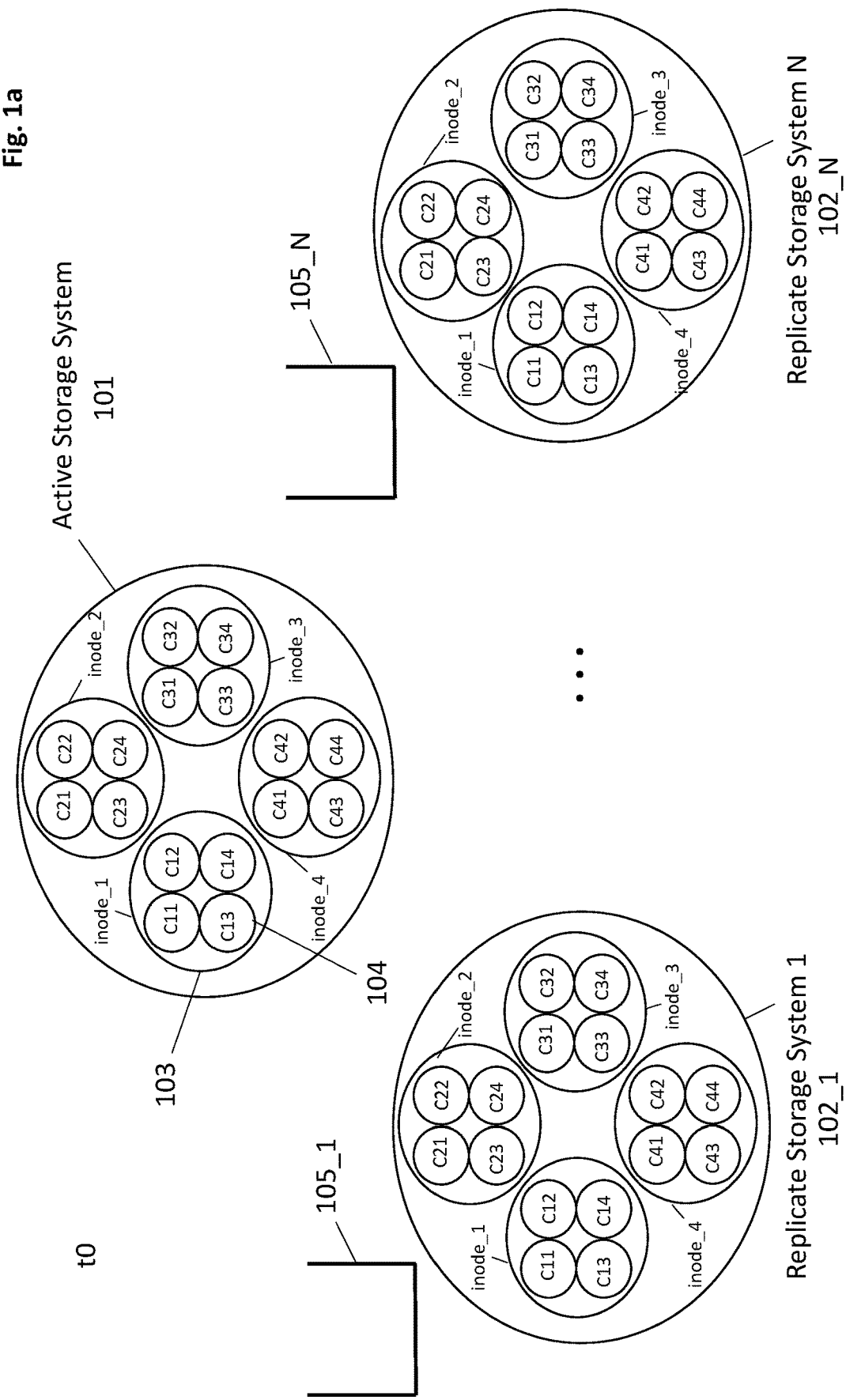

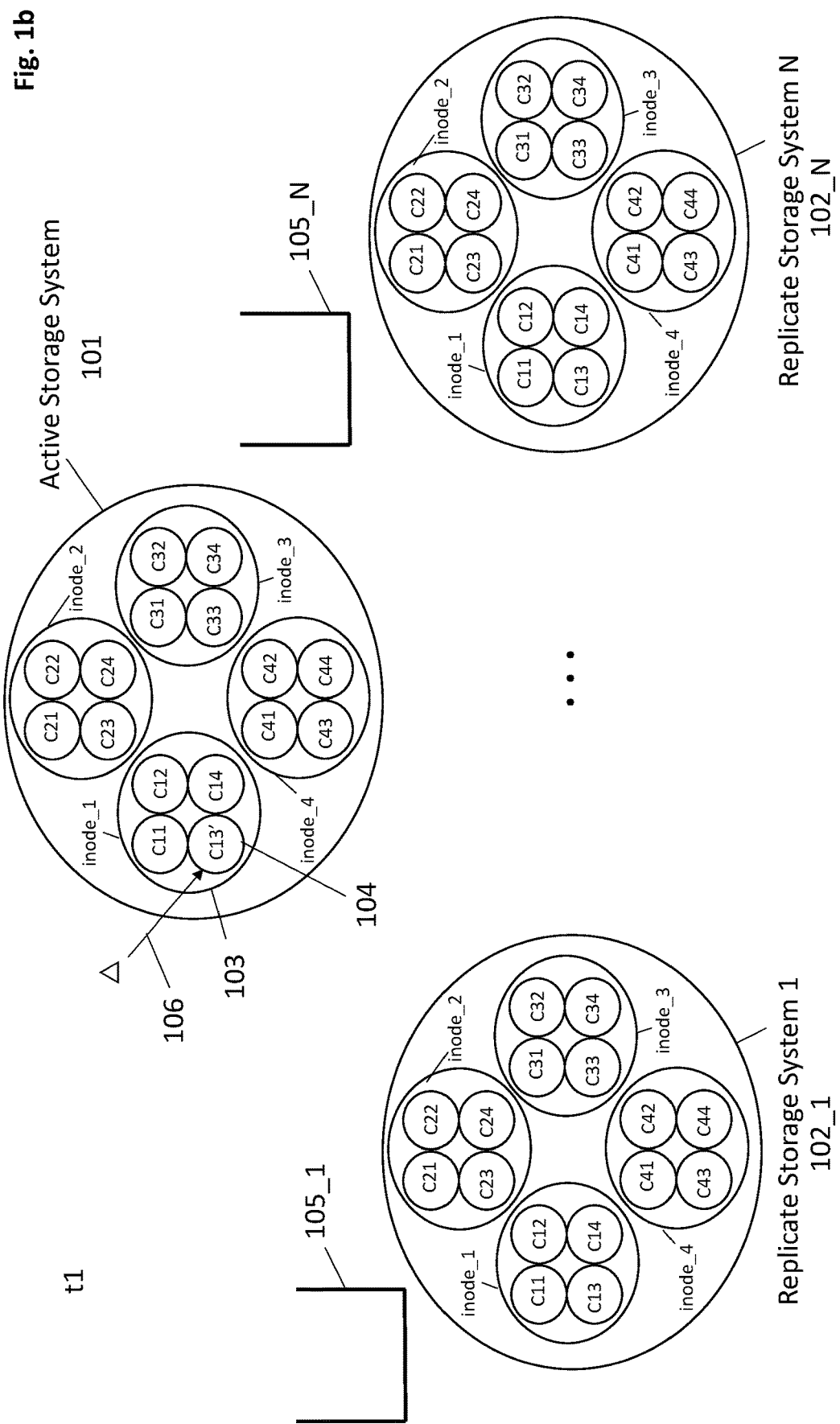

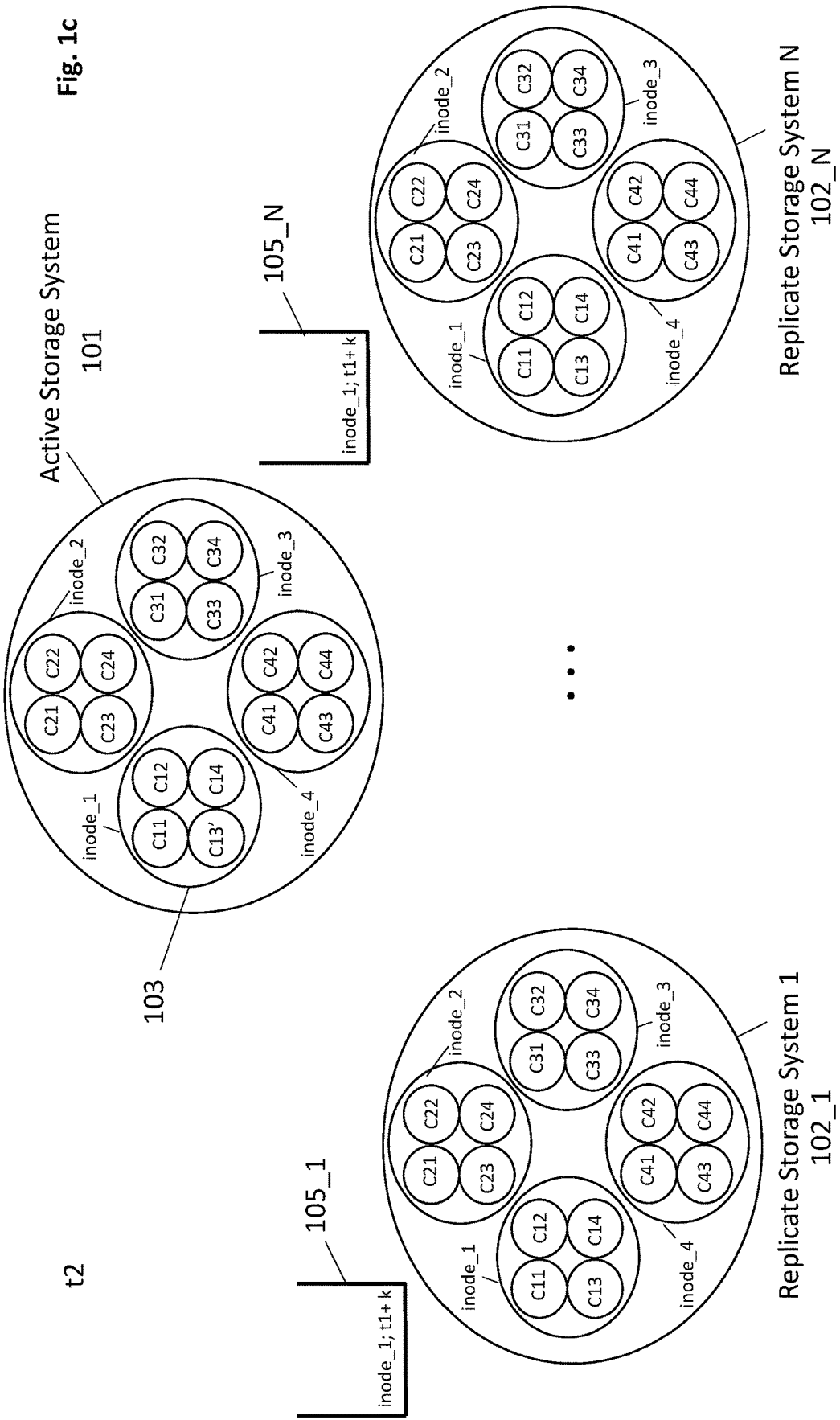

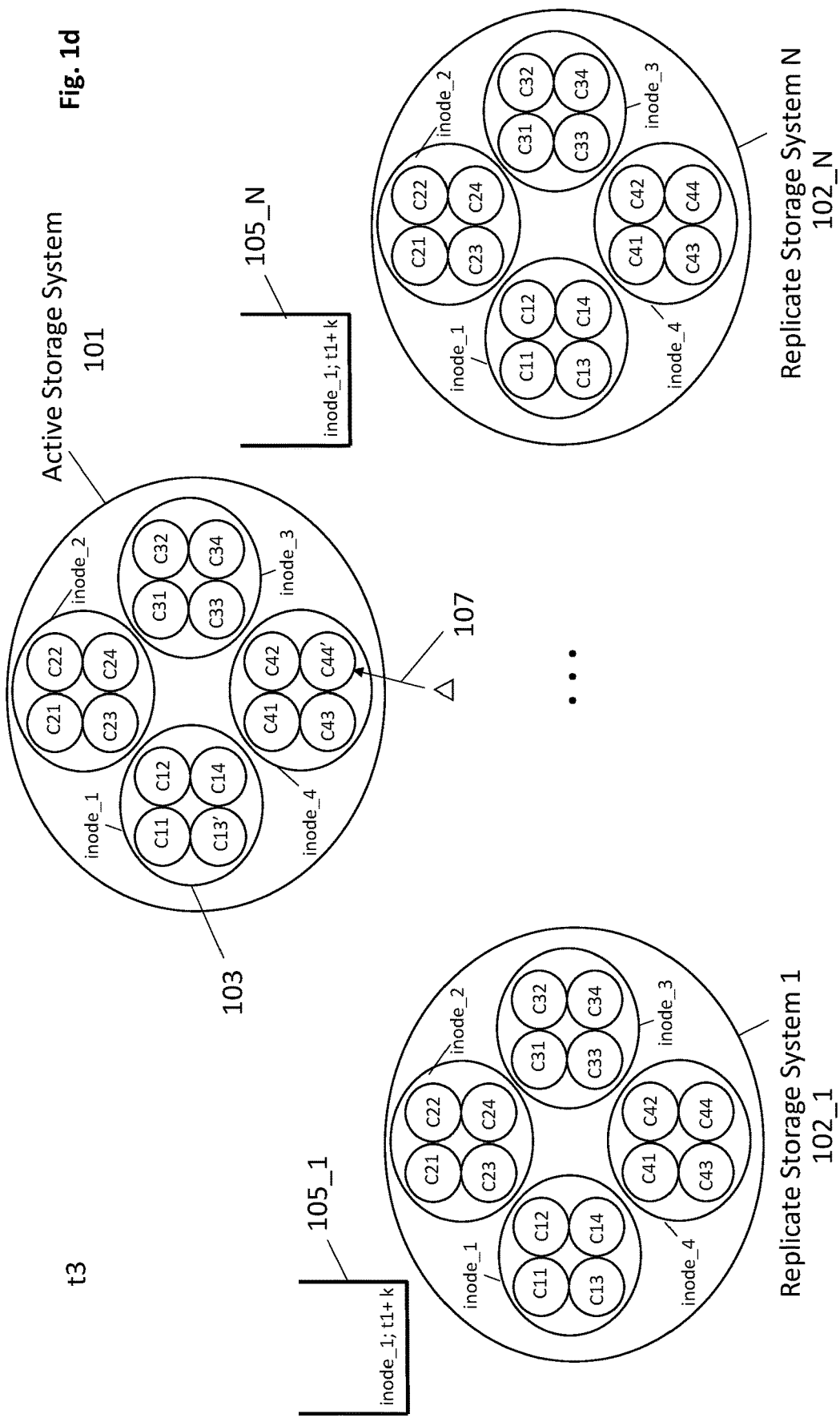

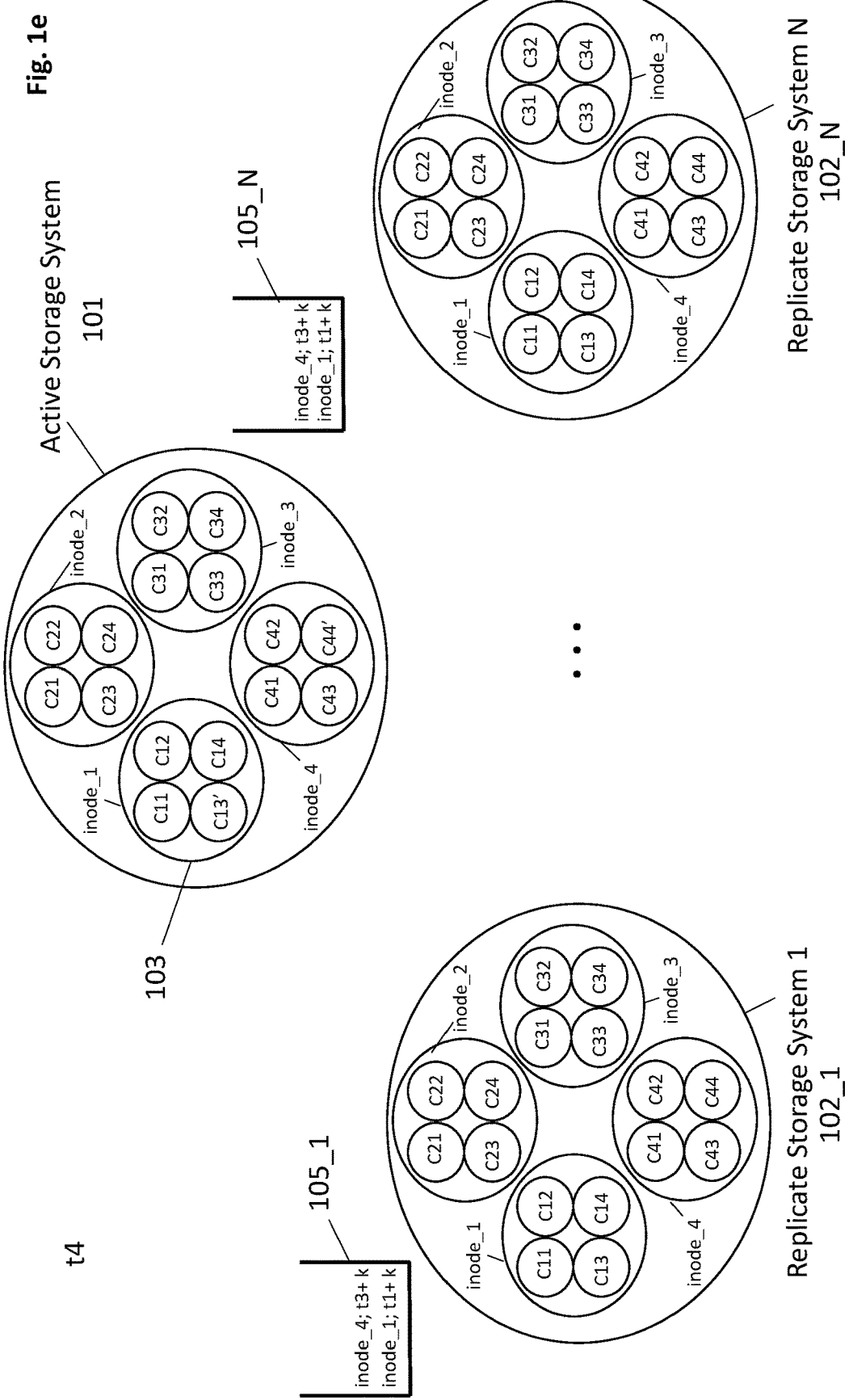

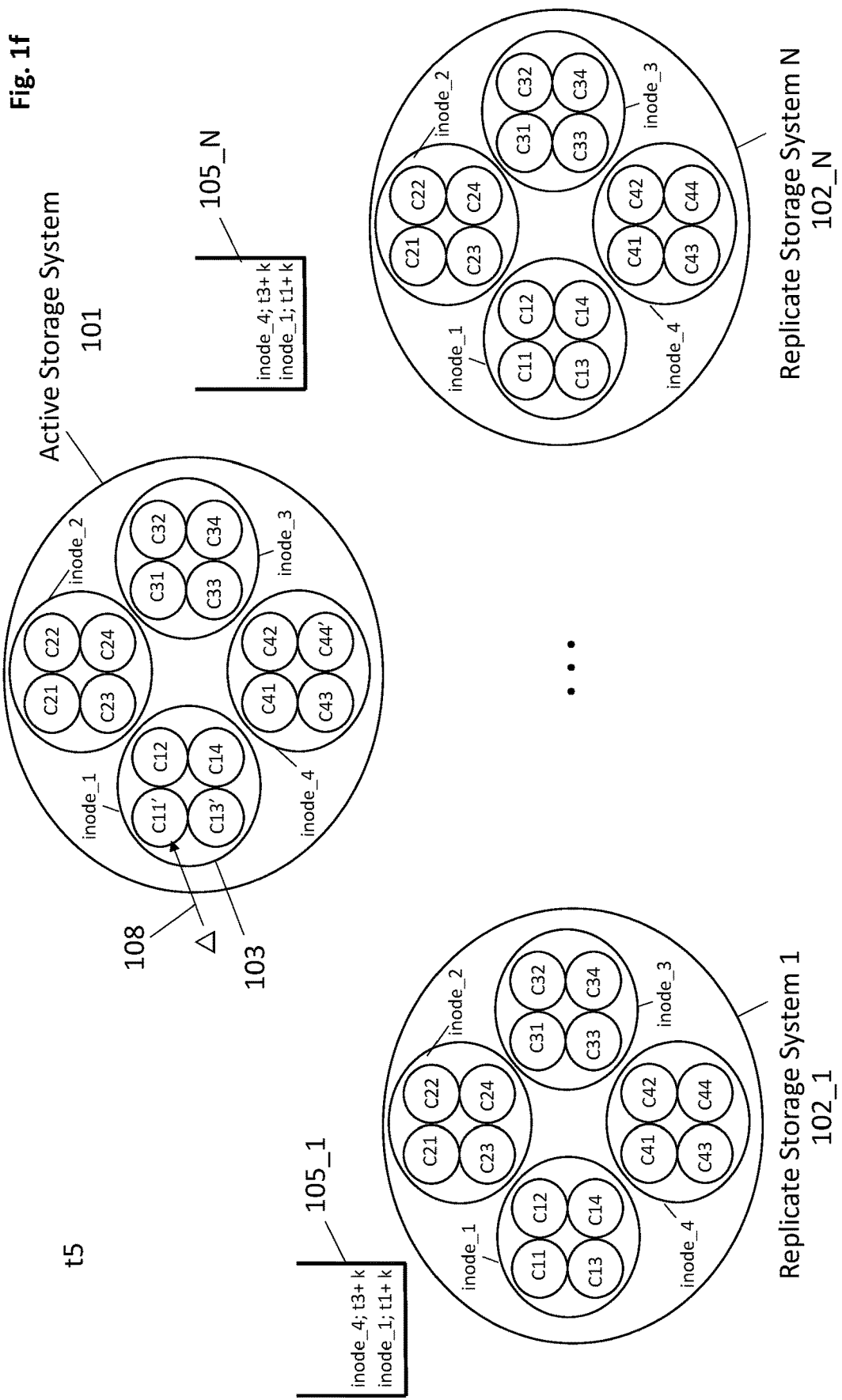

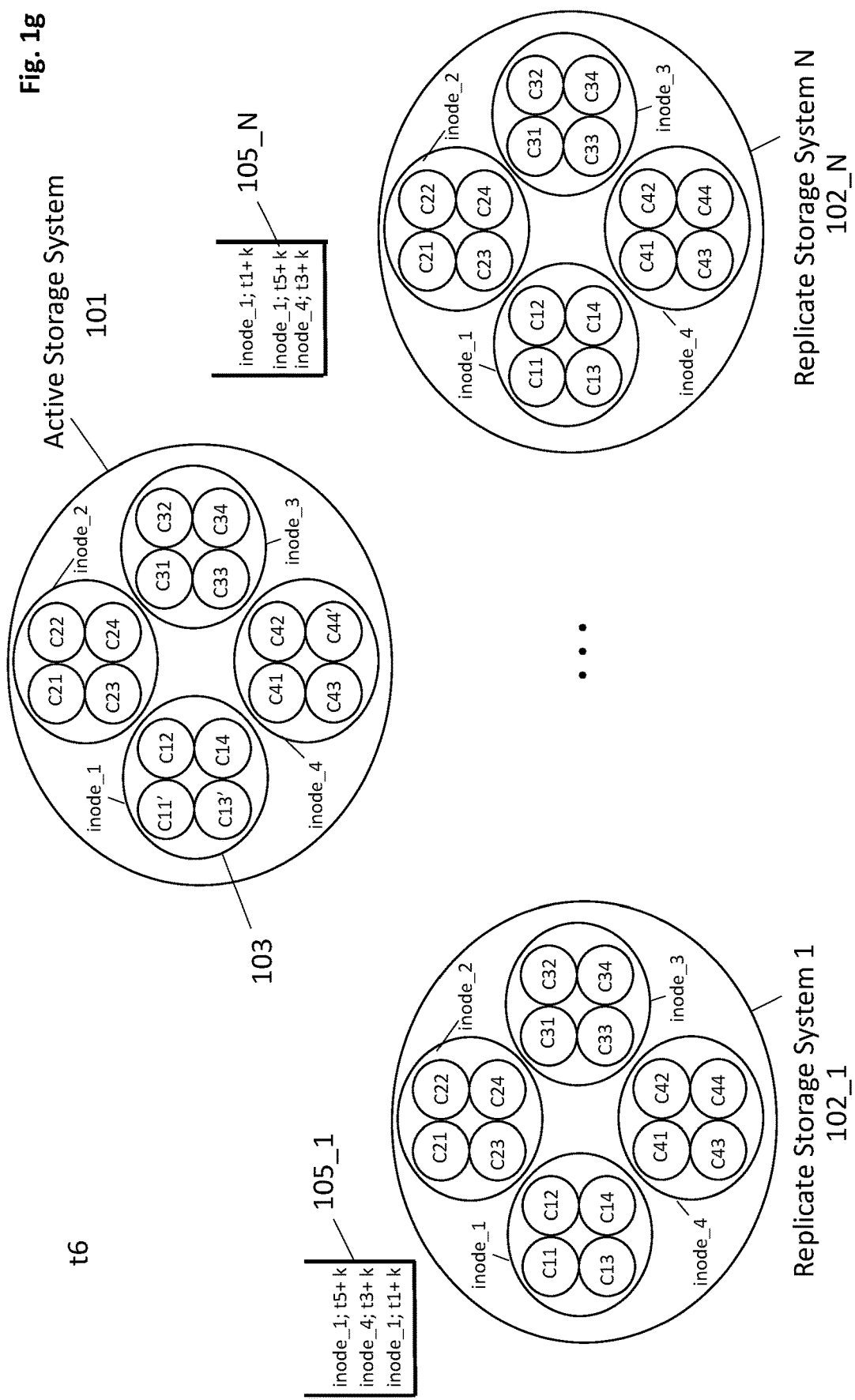

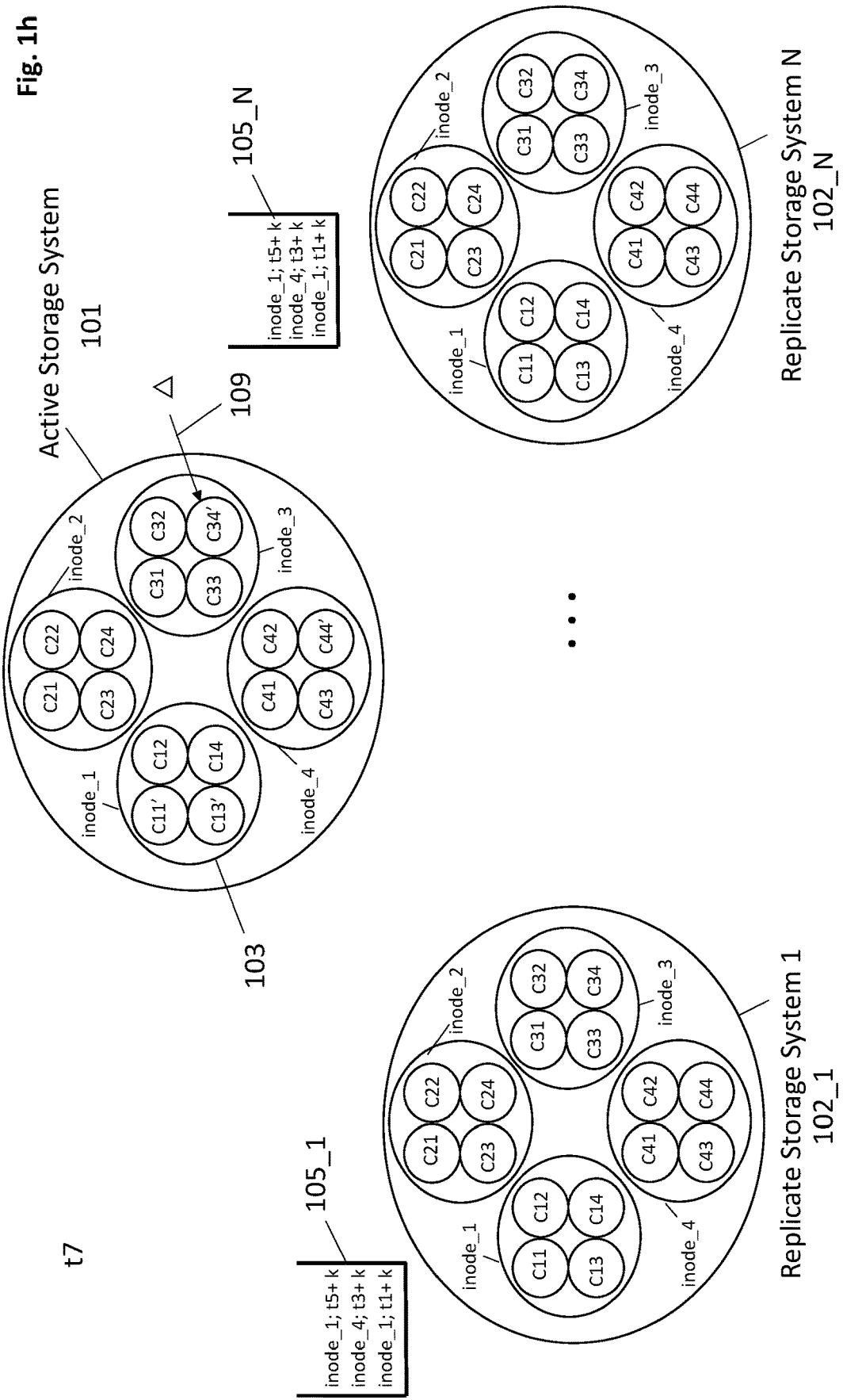

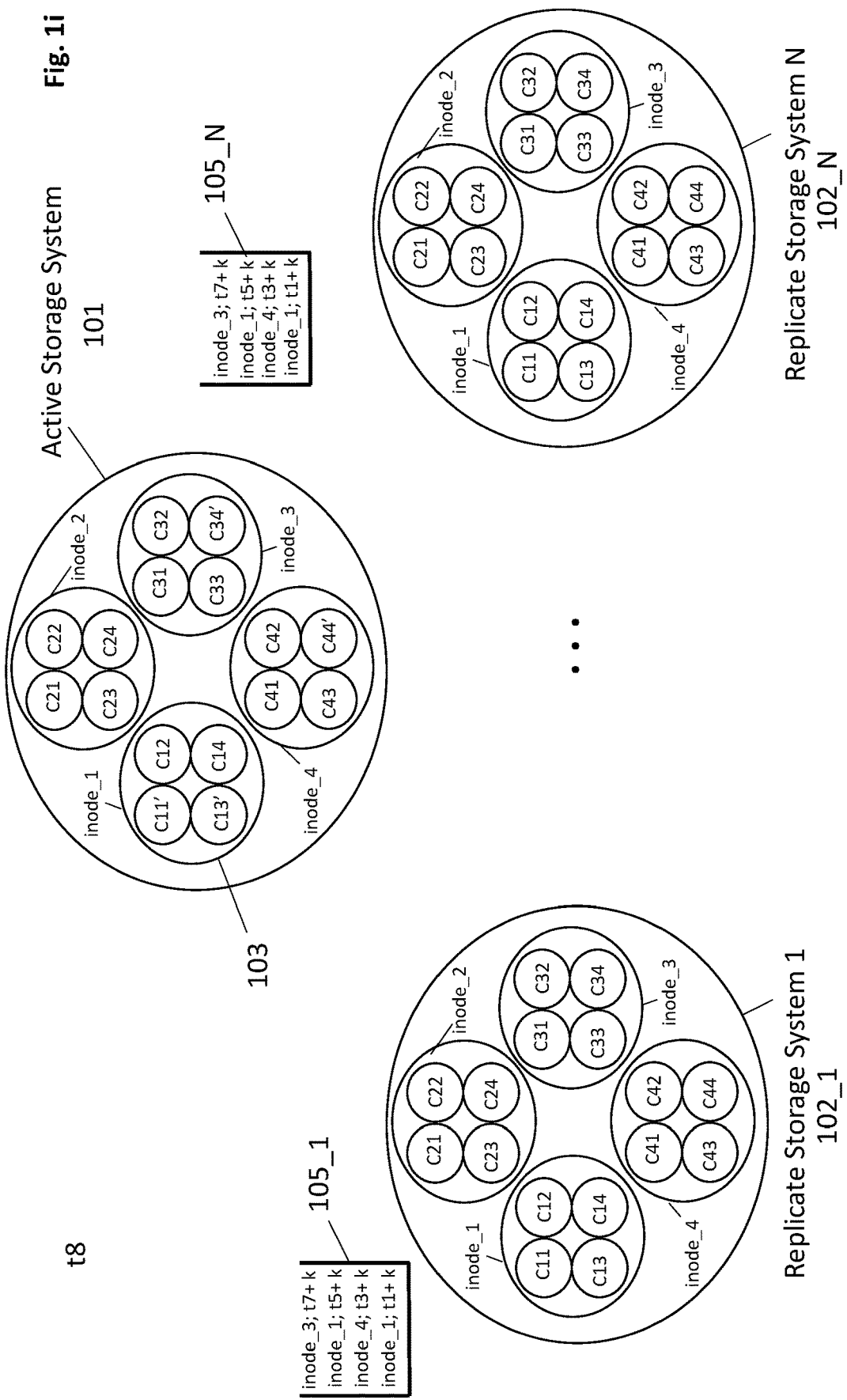

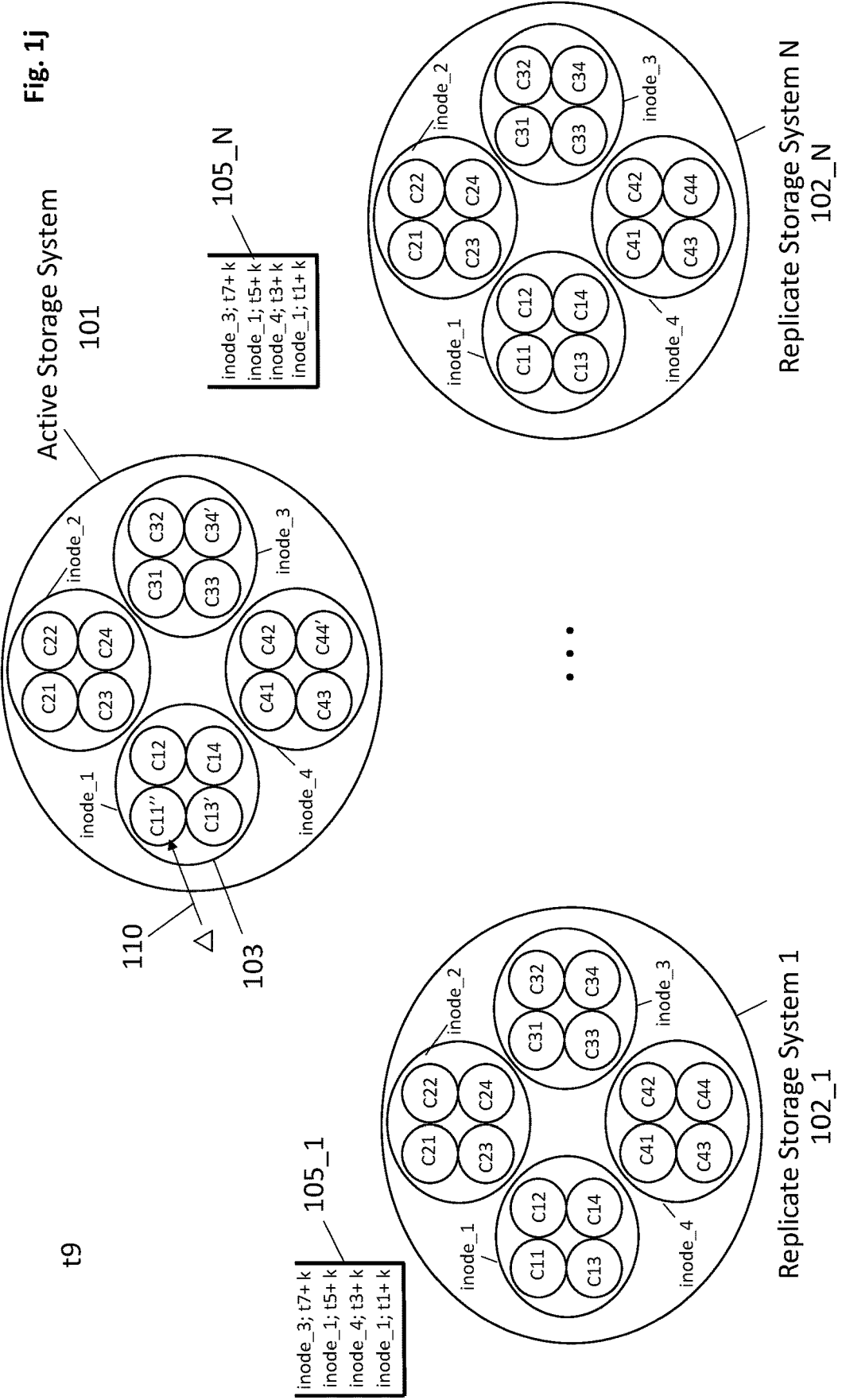

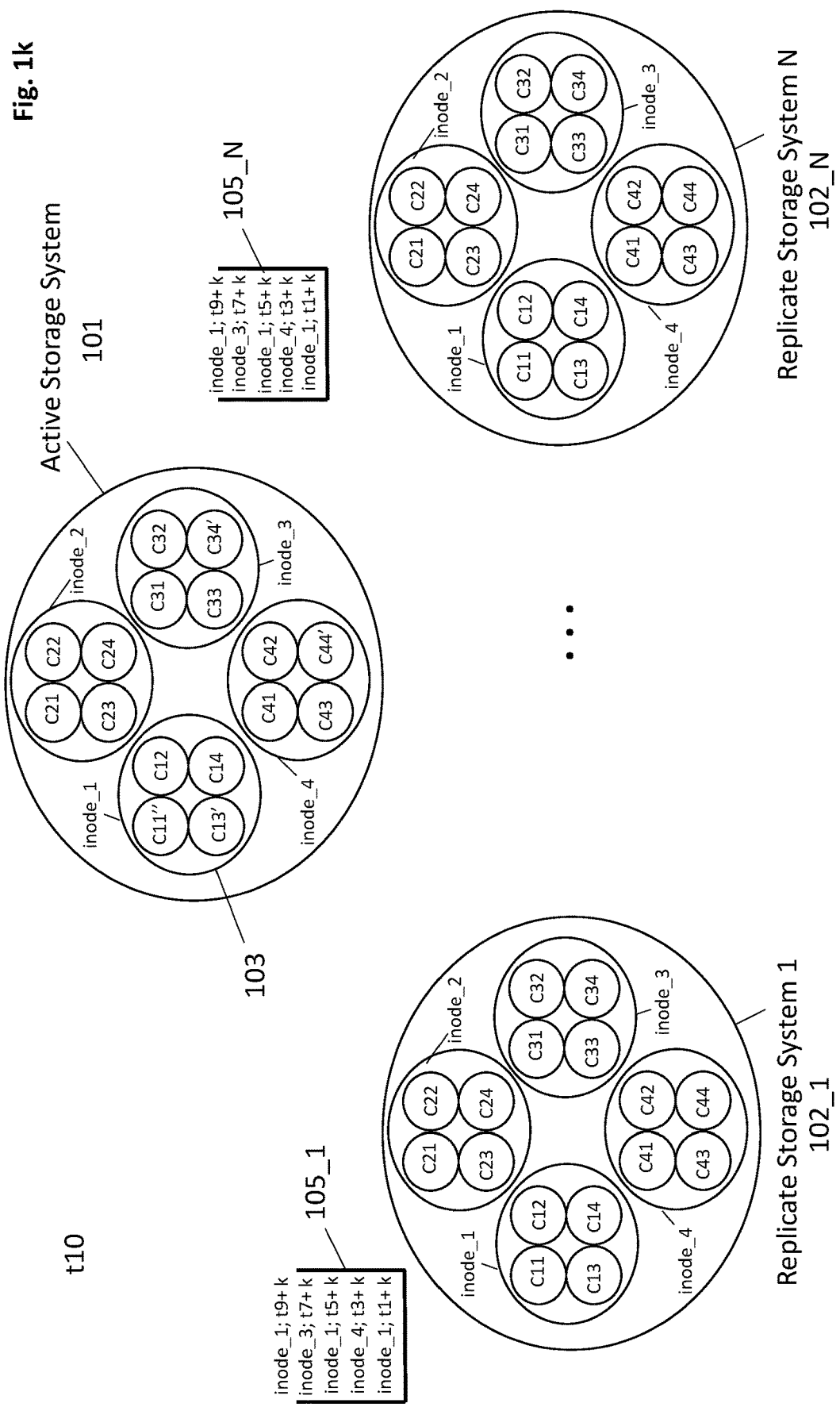

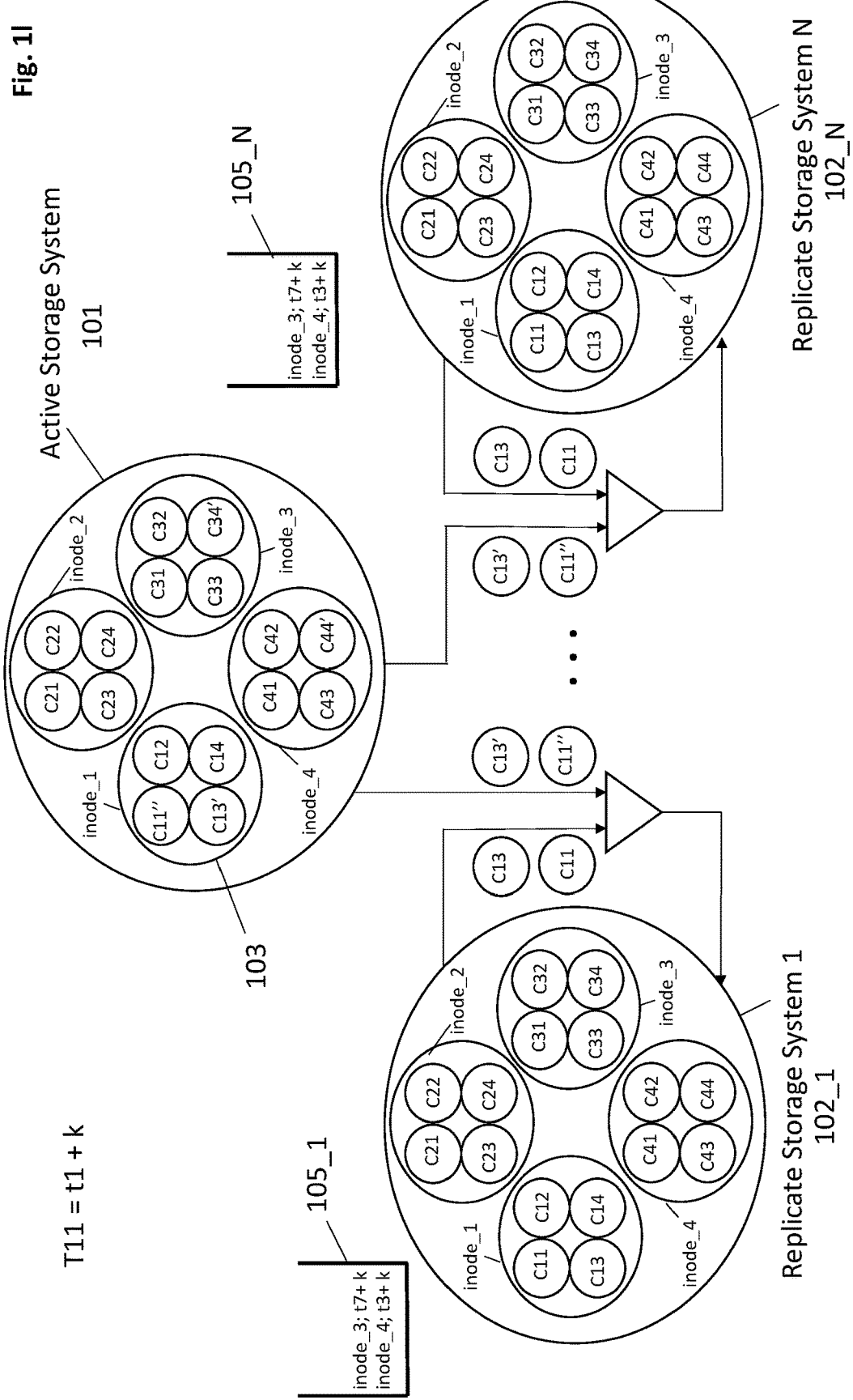

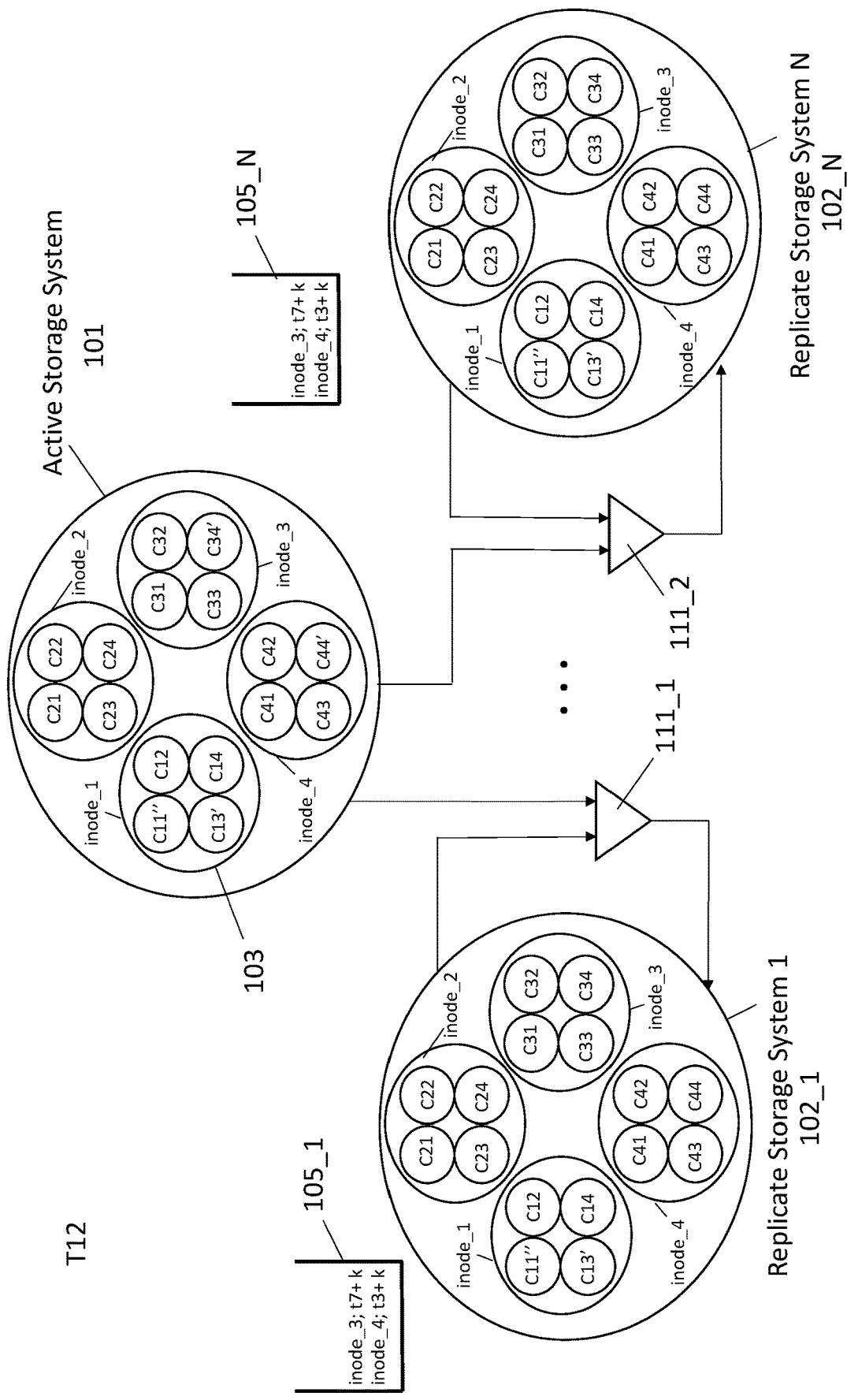

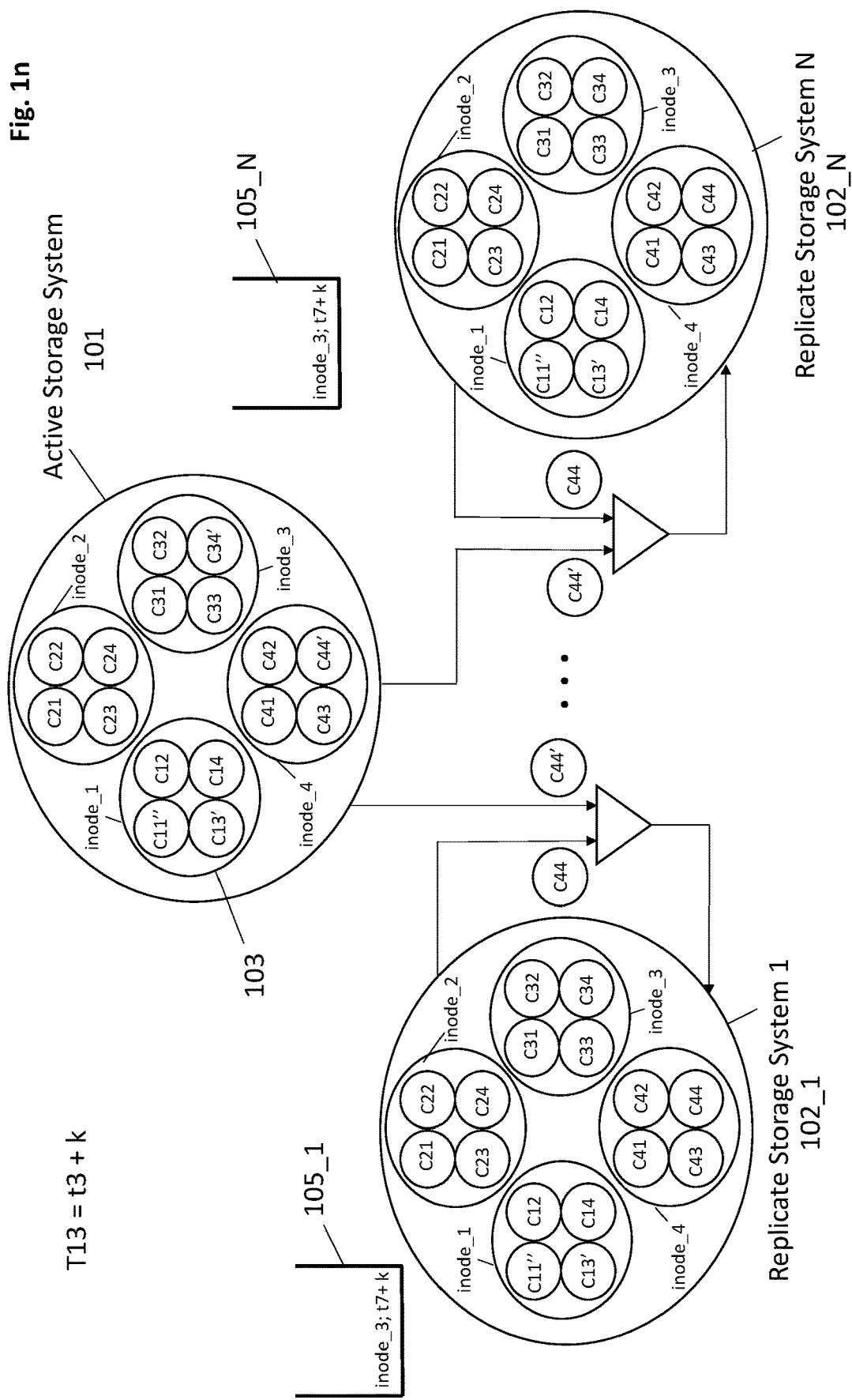

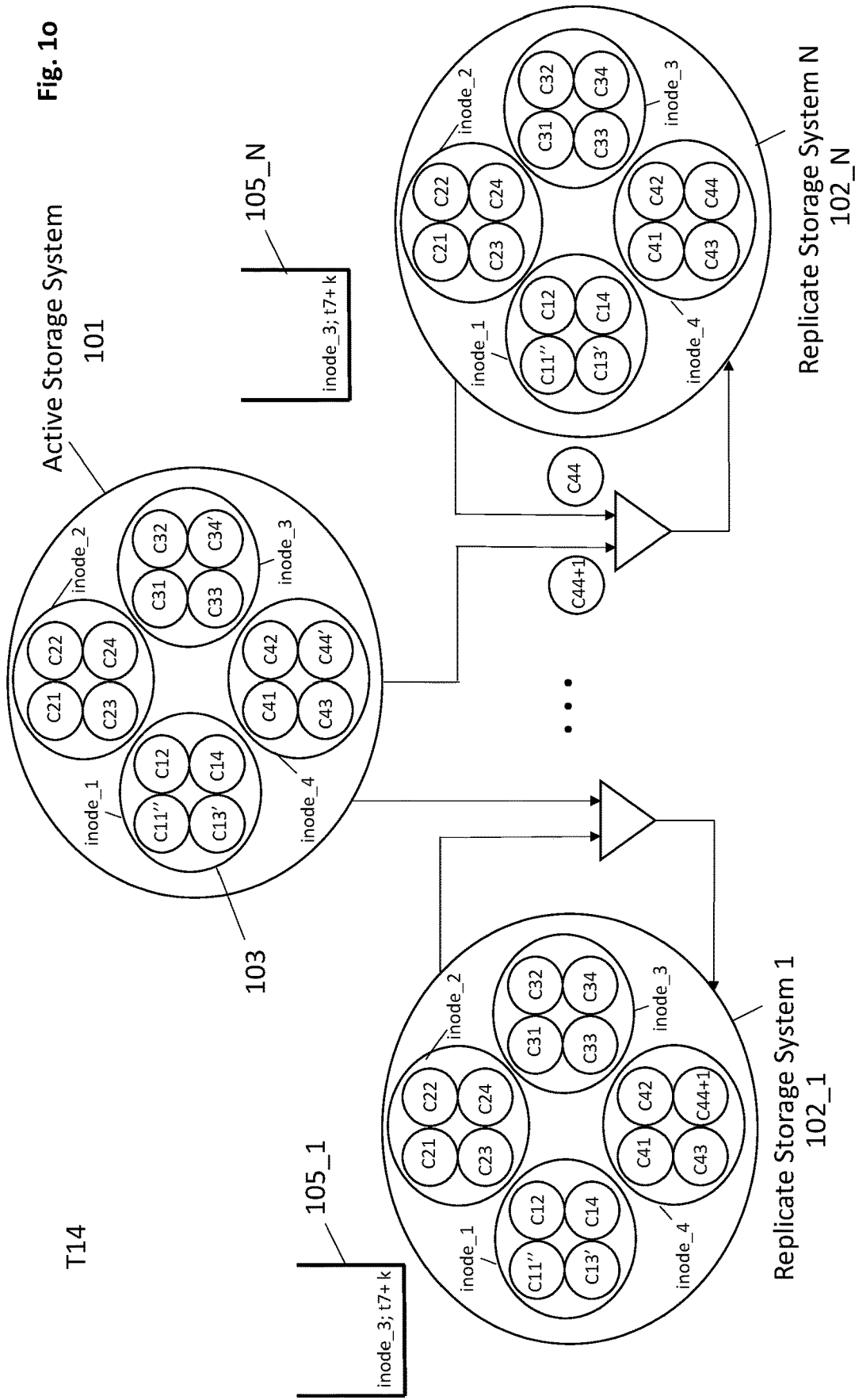

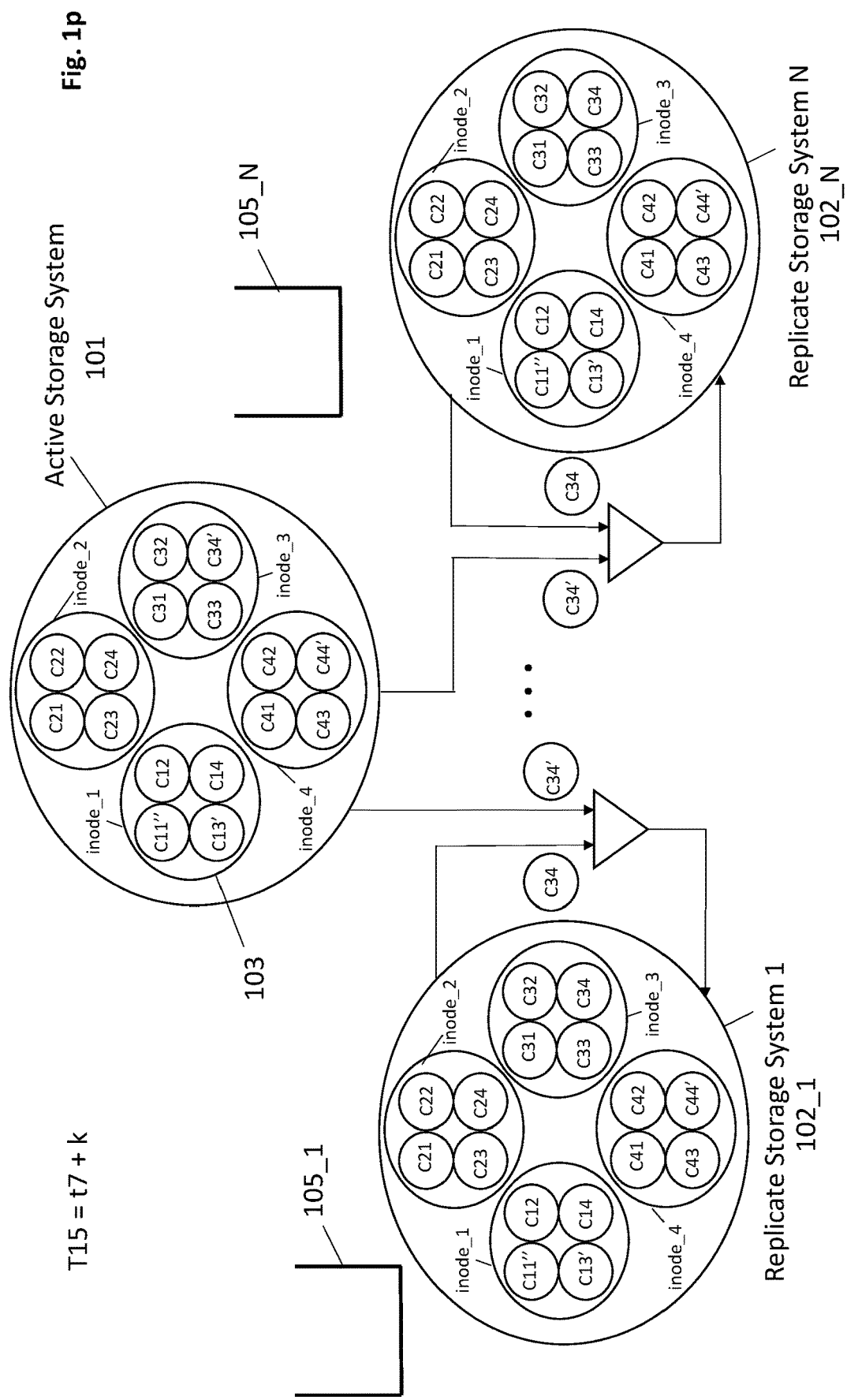

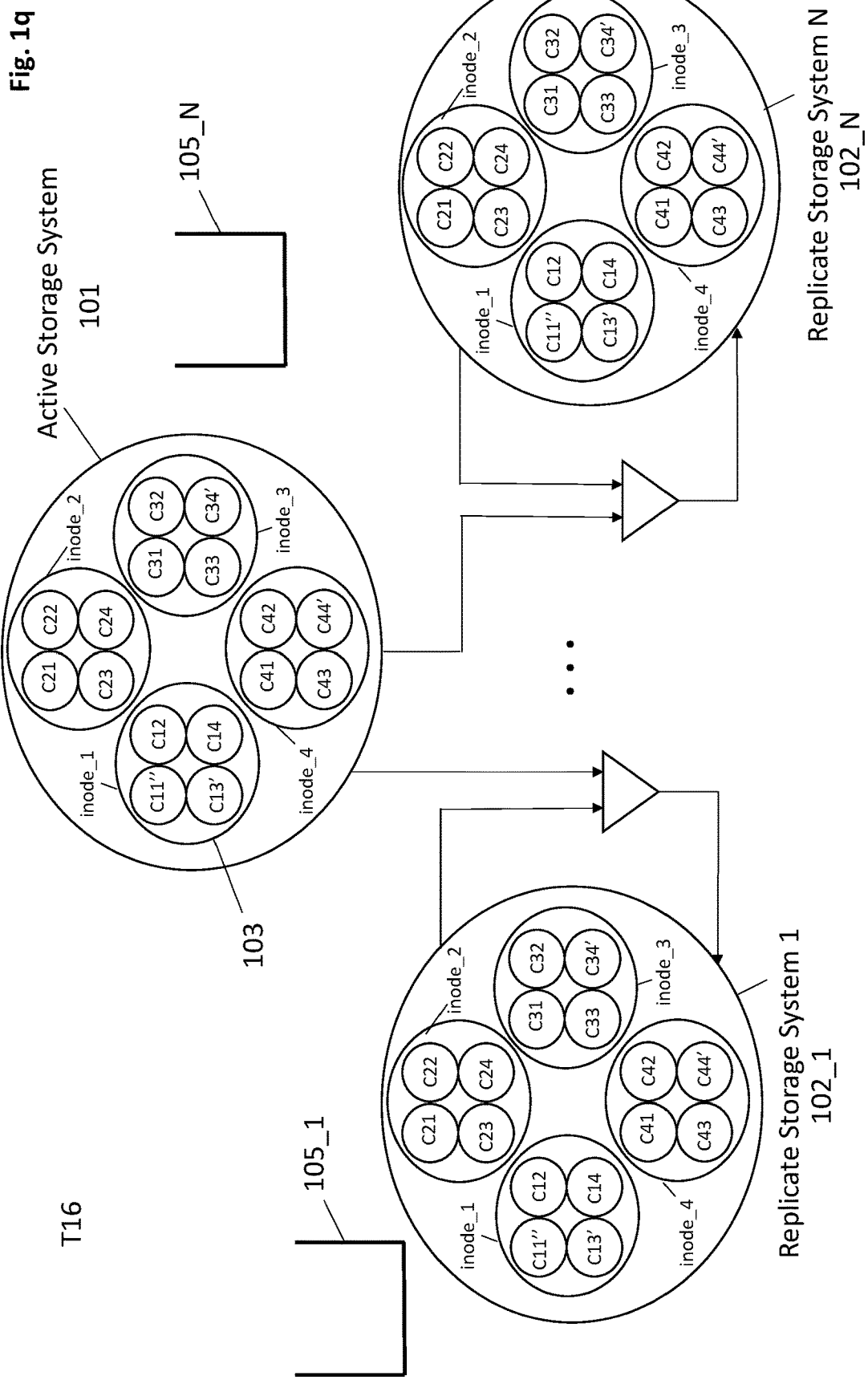

METHOD AND APPARATUS FOR RAPIDLY SYNCHRONIZING A REPLICATE STORAGE SYSTEM WITH AN ACTIVE STORAGE SYSTEM

FIELD OF INVENTION

The field of invention pertains generally to the computing sciences, and, more specifically, to a method and apparatus for rapidly synchronizing a replicate storage system with an active storage system.

BACKGROUND

With the emergence of big data, low latency access to large volumes of information is becoming an increasingly important parameter of the performance and/or capability of an application that processes or otherwise uses large volumes of information. Moreover, such information can be "mission critical" or have other levels of importance where their loss can be a serious disruption for the entities that rely on processing the information. As such, it is becoming increasingly difficult to rapidly change information while, at the same time, preserve the information while it is being changed.

FIGURES

A better understanding of the present invention can be obtained from the following detailed description in conjunction with the following drawings, in which:

FIGS. 1a, 1b, 1c, 1d, 1e, 1f, 1g, 1h, 1i, 1j, 1k, 1l, 1m, 1n, 1o, 1p and 1q depict an approach for preserving changes to an active storage system;

DETAILED DESCRIPTION

Figure 2A:
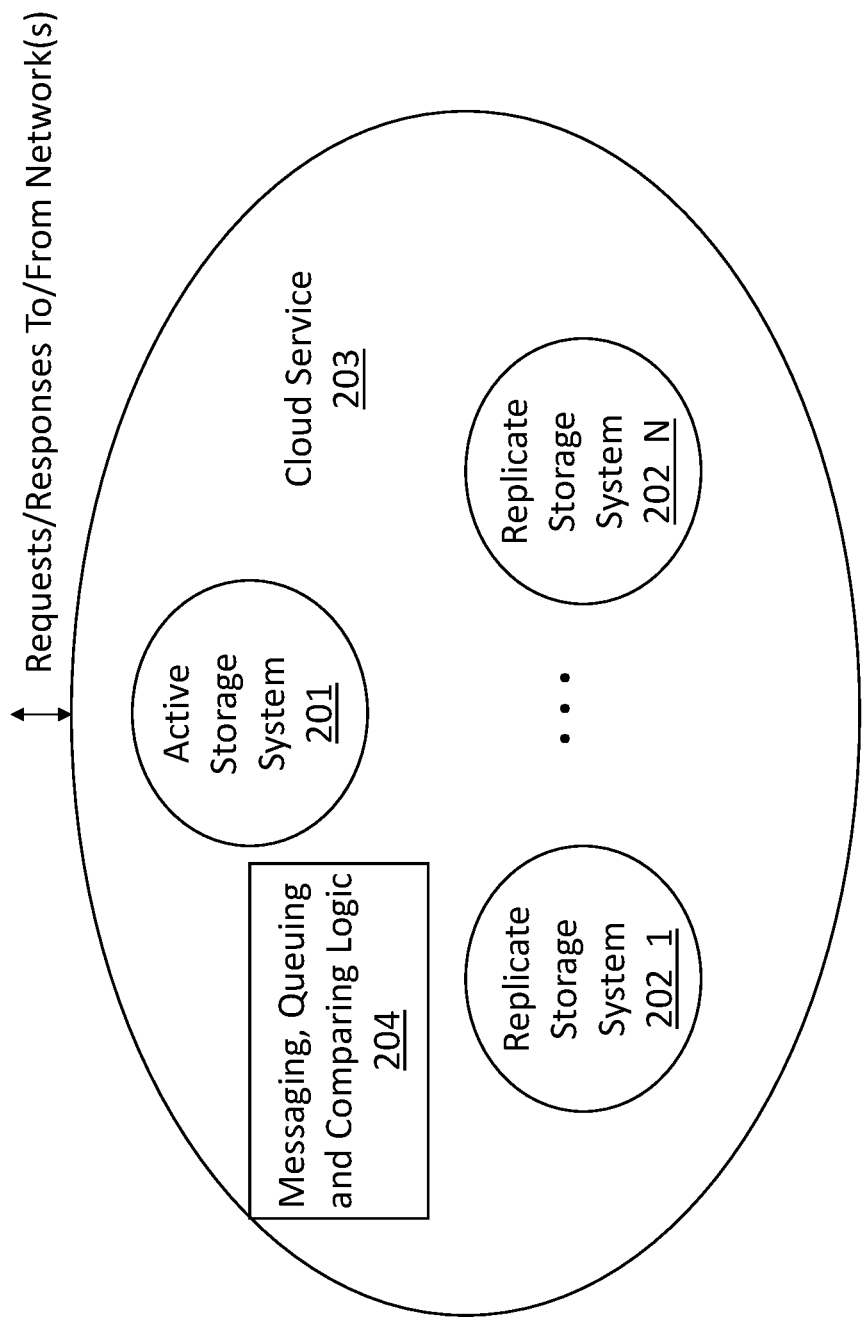
FIGS. 2a and 2b show platforms for implementing the approach of FIGS. 1a through 1q.

Storage systems have various performance metrics such as capacity (how much storage space exists), latency (how quickly the storage system is able to respond to read/write requests) and reliability (the degree to which a stored data item is guaranteed not to be lost). Reliability is typically achieved with one or more replicate storage systems. That is, one or more copies of a primary or active storage system are maintained.

Should the active storage system have a problem that results in loss of data (e.g., a hard disk drive crash), one of the replicate storage systems is called upon to retrieve the lost data. The greater the number of replicate storage systems, the greater the probability that lost data can be recovered, which, in turn, corresponds to greater overall reliability of the system.

Maintaining the replicate storage systems, however, becomes more challenging as the capacity and activity of the active storage system grows. Specifically, it becomes more difficult to maintain a copy of an extremely large scale active storage system (e.g., having a capacity in the hundreds of petabytes or higher) as changes made to the active storage system become more frequent and more diverse.

Simply stated, in the case of file systems for example, it becomes increasingly difficult for the replicate file systems to "keep up" with the state of the active storage system as the active storage system processes more and more changes to more and more different files and/or directories in shorter and shorter time increments. In such an environment, the state of the replicate file systems begin to reflect the state of the active system farther and farther back in time making recovery from data loss in the active system less likely.

FIGS. 1a through 1q depict a system and method that addresses these challenges. As will become more clear in the following discussion, the system and method described in reference to FIGS. 1a through 1p rapidly updates, within the replicate storage systems, changes made to an active storage system (irrespective of how many different files or directories within the active storage system are changed). Because updates to the replicate storage systems are applied with rapidity, the replicate storage systems reflect the state of the active storage system in near real time.

FIG. 1a shows a primary or active storage system 101 and N replicate or replicate storage systems 102_1 through 102_N. Here, the active storage system 101 is the primary/active storage system that is used by one or more users (individuals, clients, application software instances, etc.) as their primary non volatile repository. In order to meet the performance demands of the users, the active storage system 101 is implemented with high performance architectures and/or technologies that result in low latency and high capacity.

Importantly, the replicate storage systems 102_1 through 102_N are implemented with the same (or similar) high performance architectures and/or technologies as the active storage system such that the latencies of the replicate storage systems 102_1 through 102_N are comparable to those of the active storage system 101. Such an approach is distinctive from traditional "back-up" or "archival" storage systems in which slower storage technologies (e.g., tape drives) are used to replicate or make copies of the active/primary system.

Here, traditional archival storage systems are only infrequently updated with the latest state of the active storage system, which, in turn, degrades the active storage system's reliability protection. For example, a traditional archival storage system backs-up the primary system once every 24 hours (e.g., during off hours when the primary system is not being heavily utilized). So doing only preserves the state of the active storage system as it exists at the end of each work day (more or less).

By contrast, the replicate storage systems 102_1 through 102_N are ideally able to keep up with the active storage system 101 in real time such that changes made to the active storage system 101, e.g., within the past hour or past few minutes, are reflected in the replicate storage systems 102_1 through 102_N. Thus, rather than only backing-up information that exists at the end of each work day (as per traditional archival storage), information is instead continuously backed-up while the active storage system 101 is being actively used. As such, the state of the active storage system 101 as it exists whenever a problem occurs (rather than merely at the end of a work day) is largely if not entirely preserved. More details concerning embodiments of the implementation of the replicate file systems 102_1 through 102_N is provided further below.

FIG. 1a shows the active storage system 101 and its N replicate storage systems 102_1 through 102_N at an initial time t0. At time t0, it is assumed that all N replicate storage systems 102_1 through 102_N are "in synch" with the active storage system, meaning, their stored information is a perfect copy of the active storage system's information. As observed in FIG. 1a, the active storage system 101 includes four "inodes". An inode is a file or directory within a file system (and/or an identifier of a file or directory). For ease of drawing, a reference number 103 is only assigned to inode_1.

Notably each of the inodes are further divided into four different regions. Each region also has its own associated content value of the form cXX. Thus, the first region in inode_1 has its own content value c11, the second region in inode_2 has its own content value c12, the third region in inode_1 has its own content value c13, and, the fourth region in inode_1 has its own content value c14. As observed in FIG. 1a, the regions within the other inodes also have unique content values. For ease of drawing, FIG. 1a only provides a reference number 104 to the region of inode_1 103 having the content value c13. The purpose of the content values is described below.

A region is essentially a subset of the content of the larger inode. For example, if inode_1 103 represents a file, the different regions can correspond to different regions of the file. As a further example, if inode_1 103 represents a striped file, each region corresponds to a different subset of stripes. That is, if a striped file is viewed as "stripes" of information respectively stored at consecutive addresses, each region corresponds to a different address range. Alternatively, if inode_1 103 is other than a striped file, each different region can correspond to some other subset of the file that results when the file is parsed according to according to some criteria.

For example, if the file is tabular information, a first region corresponds to a first group of rows, a second region corresponds to a second group of rows, etc. As other possible examples, each region of a file corresponds to a portion of the file having unique common content (e.g., specified according to some criteria or content definition), and/or, each region of a file corresponds to a different, specific location within the file (e.g., such as separate components in a structured XML document).

The content value associated with each region is a numeric or alphanumeric value determined from its region's content. According to one embodiment, the numeric or alphanumeric structures are determined by selecting values of the file at random locations within the file. Each time a change is made to a file, values from a new set of random locations are selected. Thus, each time a change is made to a file, the region's content value changes. In an alternate embodiment, a hash is taken on the some or all of the region's content.

Notably, each of the replicate file systems 102_1 through 102_N includes an associated queue 105_1 through 105_N. The purpose of these will be discussed more thoroughly below.

FIG. 1b shows the system at a later time t1 in which a change 106 is made to the region 104 of inode_1 103 having content value c13. Here, if inode_1 103 is a file, the change 106 can be the modification of existing data, the deletion of existing data, or the addition of new data that falls with the definition of the region 104. Notably, the change 106 to the region causes the region's content value to change to a new value of c13'.

Additionally, lightweight messages are sent to the respective queues 105_1 through 105_N of the replicate storage systems 102_1 through 102_N. FIG. 1c shows another later time t2 when the messages have been received and entered into the queues 105_1 through 105_N.

As observed in FIG. 1c, each queue entry describes the change 106 in minimalist terms. Specifically, the queue entry describes the larger inode 103 (inode_1) whose region was the target of the change 106.

The queue entry also specifies a time in the future when the change 106 is to be processed by its replicate system. Specifically, as observed in FIG. 1c, the queue entry includes the time t1+k which corresponds to the time the change was made (t1) plus some additional time (k) into the future beyond when the change was made. Depending on implementation, the original message that is sent to the replicate systems can include the identifier of the inode (inode_1) plus the time of the change (t1). The receiving replicate system then adds the offset into the future (k).

In alternate embodiments, the message can also include the offset into the future. In still further embodiments, the replicate system can specify the time in the future from the time the message was received (t2) rather than the time the change was made (t1). Although the different replicate systems 102_1 through 102_N show a same time offset (k) in their respective queue entries, in various embodiments, different replicate systems can express different time offsets into the future for their respective queue entries.

The lightweight message and queue entries are pertinent in that their minimalist amount of information keeps processing times small and message delivery times small. That is, for example, assuming one or more networks exist between the active storage system 101 and the replicate systems 102_1 through 102_N, the sending of the messages over the networks adds little overhead to these networks because the packet payload is very small. As such, propagation delay through the networks is apt to be very small, and/or, the existence of the messages does not appreciably add to the offered load being presented to the networks. Likewise, for similar reasons, the creating and processing of the messages and/or queue entries can be accomplished quickly with little overhead being added to the processing resources (e.g., computer CPUs) that create and process them.

FIG. 1d shows a next later time t3 when another change 107 is made to the region of inode_4 having count value c44. As such, the change increments the count value to c44'.

FIG. 1e shows a next later time t4 when the queue entries are created and entered for the change described just above with respect to FIG. 1d. As observed in FIG. 1e, the queue entries describe both the inode whose region was targeted by the change 107 (inode_4) and a time in the future from the time the change 107 was made (t3+k).

FIGS. 1f and 1g show another change and corresponding set of queue entries. Specifically, FIG. 1f shows a change 108 being made at later time t5 to the region of inode_1 having counter value c11 (which causes the counter value to increment to a value of c11'). FIG. 1g shows the corresponding queue entries at later time t6 that identify inode_1 and future time t5+k.

FIGS. 1h and 1i show another change and corresponding set of queue entries. Specifically, FIG. 1h shows a change 109 being made at later time t7 to the region of inode_3 having counter value c34 (which causes the counter value to increment to a value of c34'). FIG. 1i shows the corresponding queue entries at later time t8 that identify inode_3 and future time t7+k.

FIGS. 1j and 1k show yet another change and corresponding set of queue entries. Specifically, FIG. 1j shows a change 110 being made at later time t9 to the same region of inode_1 that was earlier changed at time t5 (FIG. 1f). The change causes the corresponding counter value to increment to a value of c11". FIG. 1k shows the corresponding queue entries at later time t10 that identify inode_1 and future time t9+k.

FIG. 1l shows a next time t11=t1+k, which is the time specified in the first queue entry. That is, the future time that was specified in the first queue entry (t1+k) has arrived at time tn. As observed in FIG. 1l, each replicate system includes an associated comparator function 111_1, 111_2. In response to the current time reaching the time specified in the first queue entry, respective synchronization logic associated with each of the replicate systems 102_1 through 102_N processes all entries specified in their respective queues 105_1 through 105_N having the same inode as the first queue entry.

That is, all queue entries are processed having inode_1 as their inode component. Referring briefly back to FIG. 1k, the first, third and fifth queue entries all have inode_1 as their inode component. As such, the first, third and fifth queue entries are processed after time t11 in FIG. 1l. As such, FIG. 1l shows these entries as having been removed from the queue.

The processing of the queue entries for inode_1 entails each replicate system 102_1 through 102_N comparing the respective content values for its copies of the regions within inode_1 against the respective counter values for the corresponding regions within the active system 101. Those regions having a different content value as between a replicate system 102 and the active system 101 are then flagged. As of t11, the regions within inode_1 that were changed since t0 correspond to the regions whose content values do not match as between the active and replicate systems 101, 102. That is, comparing the respective content values of the four regions within inode_1, the 11 region will have differing content values as between the active and replicate systems and the 13 region will have differing content values as between the active and replicate systems.

As such, the content of these regions (e.g., the entire content of these regions as opposed to just their content values) are read from the active system 102 and compared by comparator 111 against the content of the corresponding regions within the replicate system. That is, the content of region 11 of inode_1 within the active system 101 having content value c11" is compared against the content of region 11 of inode_1 within the replicate systems 102 having count value c11. The differences in content between the two regions are identified and the version of the region in the replicate systems 102 is updated to include the changes 108, 110 that were made to the version in the primary system 101.

The content value of the newly updated region in the replicate systems 102 is also updated to reflect the content value of the corresponding region in the active system 101 (c11"). This update confirms that the replicate system's version of region 11 is now synchronized with region 11 in the active system. This update is shown in FIG. 1m at later time t12.

A same/similar process is then executed for region 13 of inode_1 within the active system 101 having content value c13'. That is, referring back to FIG. 1l, the content of region 13 with content value c13' is read from the active system 101 and compared with the content of the corresponding region 13 with content value c13 in the replicate systems 102_1 through 102_N. The differences in the content between the two regions are identified and the version of the region 13 in the replicate systems 102 is updated to include the change 106 that was made to region 13 in the primary system 101.

The content value of the newly updated region in the replicate systems 102_1 through 102_N is also updated to reflect the content value of the corresponding region in the active system 101 (c13'). This update confirms that the replicate system's version of region 13 is now synchronized with region 13 in the active system as depicted at later time t12 in FIG. 1m.

When all the queue entries have been processed for inode_1, the version of inode_1 within the replicate systems 102_1 through 102_N is fully synchronized with inode_1 in the primary system 101.

FIG. 1n shows a next time t13=t3+k, which is the time specified in the first queue entry of the remaining queues entries in FIG. 1m. That is, the future time that is specified in the first queue entry (t3+k) in FIG. 1m has arrived at time t13 in FIG. 1n. This entry identifies inode_4 as its inode component. As such, all entries in the queue having inode_4 as the inode component are processed. From FIG. 1m, only the first entry identifies inode_4 and only the first entry is removed from the queue.

Referring to FIG. 1n, the content values of the respective regions within inode_4 as between the replicate systems 102_1 through 102_N and the active system 101 are then compared. Only the 44 region in inode_4 having content value c44' does not match its counterpart content value in the replicate systems 102_1 through 102_N. As such, the content only of region 44 having content value c44+1 is read from the active system and compared against the content of its corresponding region 44 in the replicate systems 102_1 through 102_N. The differences in the content between the two regions are identified and the version of the region in the replicate systems 102_1 through 102_N is updated to include the change 107 that was made to the version in the primary system 101.

The content value of the newly updated region in the replicate systems 102_1 through 102_N is also updated to reflect the content value of the corresponding region in the active system 101 (c44'). This update confirms that the replicate system's version of the region is now synchronized with the region in the active system as depicted at later time t14 in FIG. 1o. With all the queue entries have been processed for inode_4, the version of inode_4 within the replicate systems 102_1 through 102_N is fully synchronized with inode_4 in the active system 101.

FIG. 1p shows a next time t15=t7+k, which is the time specified in the queue entry in FIG. 1o. That is, the future time that is specified in the queue entry (t7+k) in FIG. 1o has arrived at time t15 in FIG. 1p. This entry identifies inode_3 as its inode component. As such, all entries in the queue having inode_3 as the inode component are processed. From FIG. 1o, the entry is the only entry in the queue and is therefore removed from the queue.

FIGS. p and q show the processing of the entry according to the same process described above for the other entries. Note that, for the sake of ease of discussion, no further changes were made to the active system 101 after change 110 in FIG. 1j. Importantly, additional changes could have been made and entered in the queues 105_1 through 105_N at any moment from time t9 in FIG. 1j to time t16 in FIG. 1q. If any such change targeted any one of inode_1, inode_3 or inode_4 before the first entry in the queue for the inode was processed, the additional entry would also have been processed with the first entry in the queue for that inode.

The above described process is able to rapidly synchronize a replicate system 102 with the active system 101. Here, as described above, the replicate systems 102 are implemented with technology: 1) having comparable latencies (by using same or similar underlying architectural and/or hardware technologies) as the active system 101, rather than being implemented with substantially slower "archival" technologies; 2) and/or small communicative and/or processing overhead.

Additionally, the time in the future "k" at which a queue entry's change is processed sets a minimum temporal bound as to when not only the change, but all subsequent changes targeted to the same domain/inode that are reflected in the queue when the time in the future arrives, are entered into the replicate system. Said another way, an entire inode's changes are updated in time increments of no less than k units of time. Thus, by setting k sufficiently small, the replicate systems' different inodes record the state of the active system's corresponding inodes at only a small amount of time in the past.

The number of replicate systems increases the overall reliability of the active system's stored data (the more replicate systems, the more copies of the active system's regions that are available for recovery from a failure of the active system and other replicate system(s)).

Notably, in various other embodiments, the value of k can be changed across replicate systems. For example, higher performance replicate systems (that are synchronized closer to the active system in time) may use a smaller k value than lesser performance replicate systems (that are synchronized farther away from the active system in time). Here, system administrators can configure how much replication performance is desired/required in view of, e.g., available networking and processing resources.

Further still, different values of k can be assigned to different regions with the active system. For example, a region/inode that has higher priority (in terms of reliability needs) and/or is more frequently targeted with changes is assigned a lower k lower value than other regions/inodes within the system that are lesser priority or are not as frequently accessed.

Further still, to the extent frequency of changes is a factor in setting the k value for a particular inode/region within a system, e.g., in view of deep knowledge of the file system and/or its workload, the k value can be dynamically changed over the runtime of the system such that, e.g., during periods of time when a particular region/inode is being frequently accessed the k value for that region/inode is lowered, whereas, during periods of time when a particular region/inode is not being frequently accessed the k value for that region is increased.

Changes in the rate at which changes are made to particular region/inode can be detected ahead of time by monitoring the request queue(s) that feed(s) the active system 101. By so doing, the k value for a particular region/inode can be tweaked before the rate change actually occurs. For example, a large number of changes that are to be suddenly made to a particular region/inode that has been relatively inactive, and therefore has large k value, can be detected by monitoring the request queue(s) that feed(s) the active system 101 and lowering the region's/inode's k value before the changes are actually made.

In further embodiments, the logical processing performed at the active system 101 is enhanced to queue one or more slices of an inode's region content that include recently changed content of the inode region for delivery to the comparison functions of the replicate systems so that less content needs to be physically compared.

In still further embodiments, a distributed transaction (a single larger scale operation that consists of a plurality of concurrent sub-operations that execute from the stored information) running from the active storage systems is designed to compare the counter values of the regions that are being read from and/or written to by the transaction as between the replicate and active storage systems. If any counter values between corresponding regions do not match, the transaction is rolled back and rescheduled for execution at a later time because the different counter values mean the transaction is executing on information that is being changed and the preservation of the change has not yet been preserved (the preservation of the change is still in flight).

In further embodiments, the overall storage system includes a "crawler", which browses the active storage system in a sharded way to parallelize, each participant taking a shard (e.g., each chard corresponds to a different inode or group of inodes). The crawling is recursive and can run multiple times and will only schedule for processing inodes that have changed since the last crawling. This state is kept and tied to the topology of the participants (e.g. each shard has its own crawling state). In essence, the crawler acts as the core technology that creates and/or causes the messages describing the changes made to the active system to be sent to the replicate systems. The crawler can be implanted as application software that executes on one or more computers that have networked access to the active storage system.

Although the discussion above has been directed to file systems (where each inode corresponds to a file or directory), the overall synchronization approach can be applied to other storage technologies such as object storage systems. That is, for instance, the active storage system 101 and replicate storage systems 102_1 through 102_N can be implemented as object storage systems. In this case, each object corresponds to a different inode and the different regions within an inode correspond to different segments of information within the object (e.g., if the object corresponds to a sparse file, the different regions corresponds to a different group of stripes).

As is known in the art, in the case of object storage systems, units of stored information ("objects") are identified with unique identifiers ("object IDs"). Thus, whereas a traditional file system identifies a targeted/stored item with a path that flows through a directory hierarchy ("filepath") to the item, by contrast, in the case of object storage systems, targeted/stored items are identified with a unique ID for the object.

Figure 2B:
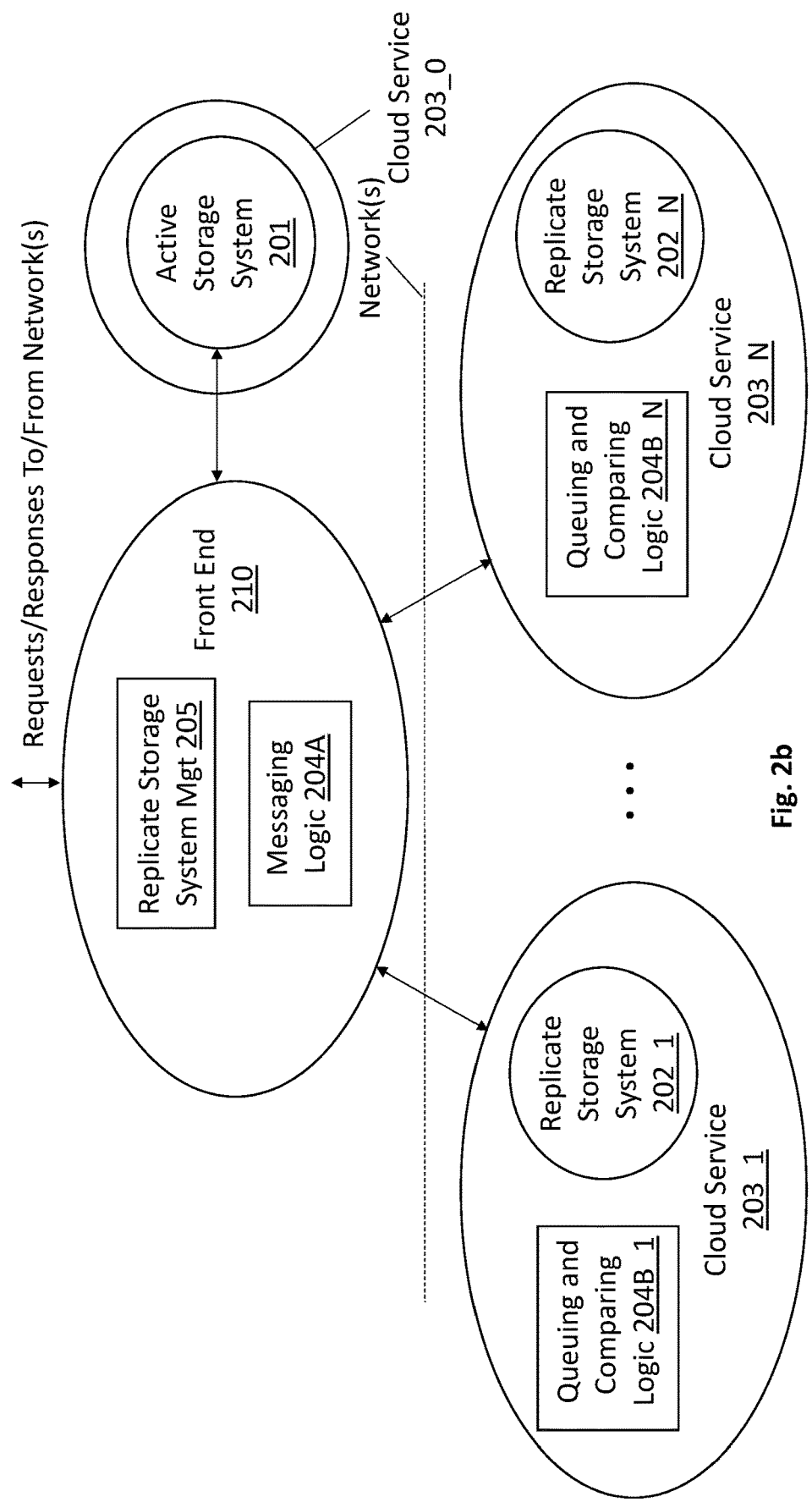

FIGS. 2a and 2b shows possible implementations of the aforementioned storage system that make use of commercially available "cloud" services (such as cloud storage services) to implement the overall system. As is known the art, cloud services are generally implemented as clusters of hardware and software resources that are commercially available through one or more networks to provide various computer related functions (compute, storage, etc.). Clients (e.g., computer systems, application software instances, enterprises, etc.) invoke and make use of the cloud service's resources by sending specific functional calls, requests, etc. to the cloud service through the network(s).

FIG. 2a shows a first approach in which the active storage system 201 and the replicate storage systems 202_1 through 202_N are implemented within a single cloud storage service 203. Here, the logic 204 to implement the crawling, messaging, queuing and comparison functions are also implemented within the cloud storage service 203 (the service provider may internally invoke compute services/engines apart from the pure storage services to implement these functions).

FIG. 2b shows another approach where the active storage system 201 and the replicate storage systems 201_1 through 201_N are implemented with their own respective cloud services 203_0, 203_1 through 203_N (some or all of which can be cloud storage services). Here, a front-end 210 receives, processes or generates storage requests (e.g., as part of executing application software) that are directed to the active cloud storage service 201 as the primary non volatile storage repository. The front end 210 can be implemented with a compute cloud service (e.g., a compute engine provided by any of Amazon AWS, Google Cloud or Microsoft Azure) or, e.g., a proprietary compute system/engine.

The front-end 210 also includes software and/or hardware 204A to crawl the active storage system and create and send messages to the replicate storage systems 202_1 through 202_N describing Mode changes made to the active storage system 201. Such messages can also include the applicable k value(s), in which case, management/control of the replication systems is also being performed by software and/or hardware 205 in the front end. The cloud services 203_1 through 203_N that implement the replicate systems 201_1 through 201_N include software and/or hardware 204B_1 through 204B_N to perform the queuing and comparison functions. One or more of the replicate storage systems can be implemented within a single cloud service.

Although not specifically referred to in FIGS. 2a and 2b, the service 203 of FIG. 2a and/or the front end 210 of FIG. 2b can be further extended to include software and/or hardware that queues changed slices of the content of a changed Mode region to reduce content comparison overhead, and/or, distributed transaction rollback based on region counter comparison mismatches as mentioned above.

Again, any storage cloud services can be file based storage services (e.g., Amazon Elastic File System (EFS) from Amazon, Google Drive from Google, and Azure Files from Microsoft) and/or object based storage services (e.g., Amazon Simple Storage Service (Amazon S3), Google Cloud Storage and Azure Blob Storage from Microsoft). To the extent file based storage services are used, such services can support any of a number of different file system interfaces such as NFSv3, NFSv4, SMB2, SMB3, FUSE, CDMI, etc. Also, file based storage services can be implemented with an object storage system having a file system interface. That is, front end logic of the object storage system receives file system requests (e.g., formatted according to a file system interface (e.g., NFSv3, etc.)), converts the filepaths specified in the requests to corresponding object IDs, and then applies the requests with objects IDs to the underlying object storage system To the extent any object storage systems are used, such object storage systems can be implemented as described in U.S. Pat. No. 9,524,302 entitled "Distributed Consistent Database Implementation Within An Object Store", having application Ser. No. 14/198,486 and filing date of Mar. 5, 2014 and assigned to Scality S.A. of Paris, France. Notably, the object storage system can be expanded to include, e.g., as components of the connector node system (CNS) instances described therein, software and/or hardware designed to perform any of the messaging, queuing, comparing and/or other processing (e.g., queueing of region slices, transaction rollback based on counter comparisons) described at length above with respect to FIGS. 1a through 1q.

Figure 3:
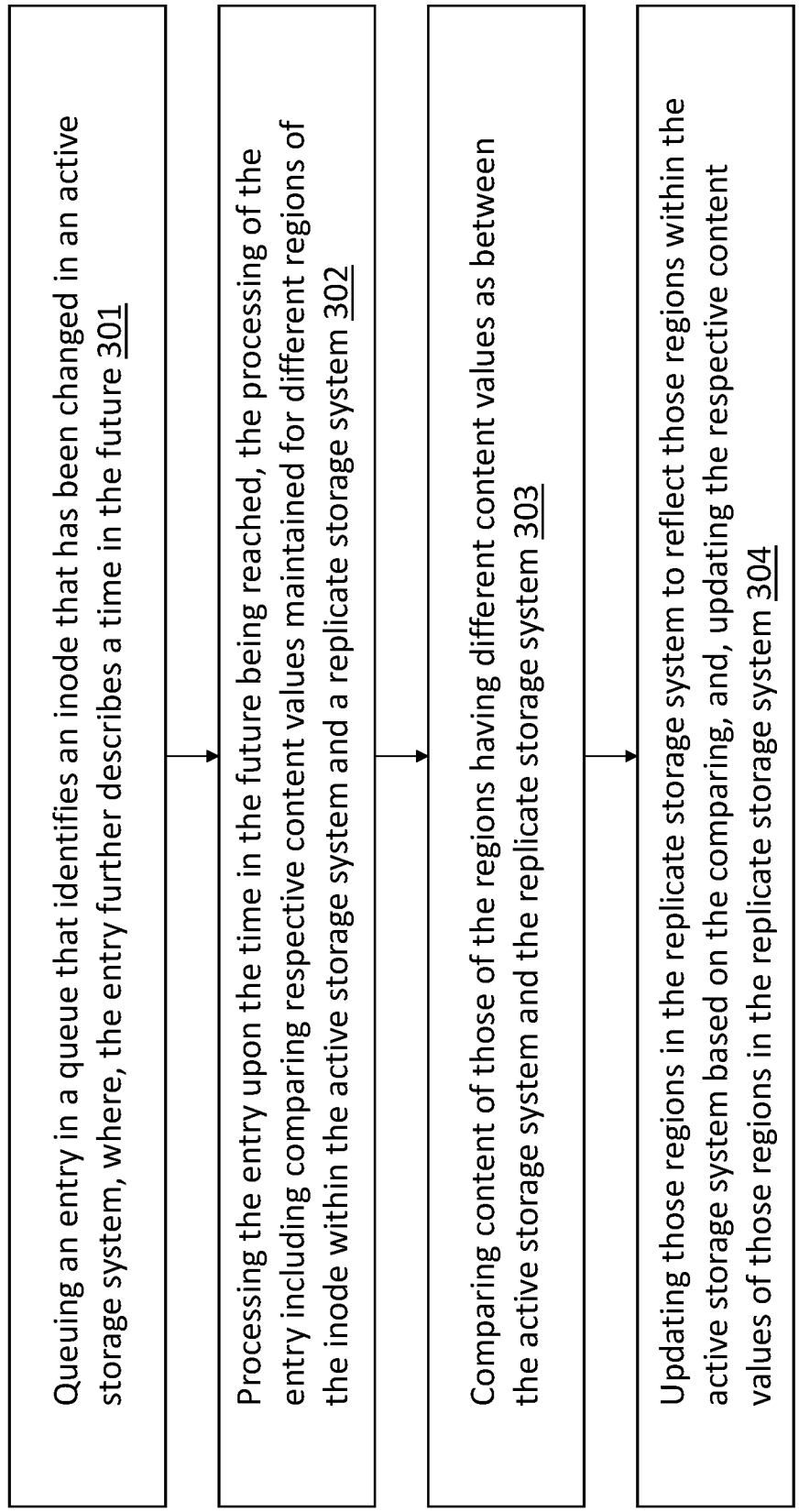
FIG. 3 shows a methodology for preserving changes to an active storage system.

FIG. 3 shows a methodology described above. As observed in FIG. 3, the method includes queuing 301 an entry in a queue that identifies an inode that has been changed in an active storage system, where, the entry further describes a time in the future. The method includes processing 302 the entry upon the time in the future being reached, the processing of the entry including comparing respective content values maintained for different regions of the inode within the active storage system and a replicate storage system. The method includes comparing 303 content of those of the regions having different content values as between the active storage system and the replicate storage system. The method includes updating 304 those regions in the replicate storage system to reflect those regions within the active storage system based on the comparing, and, updating the respective content values of those regions in the replicate storage system.

Figure 4:
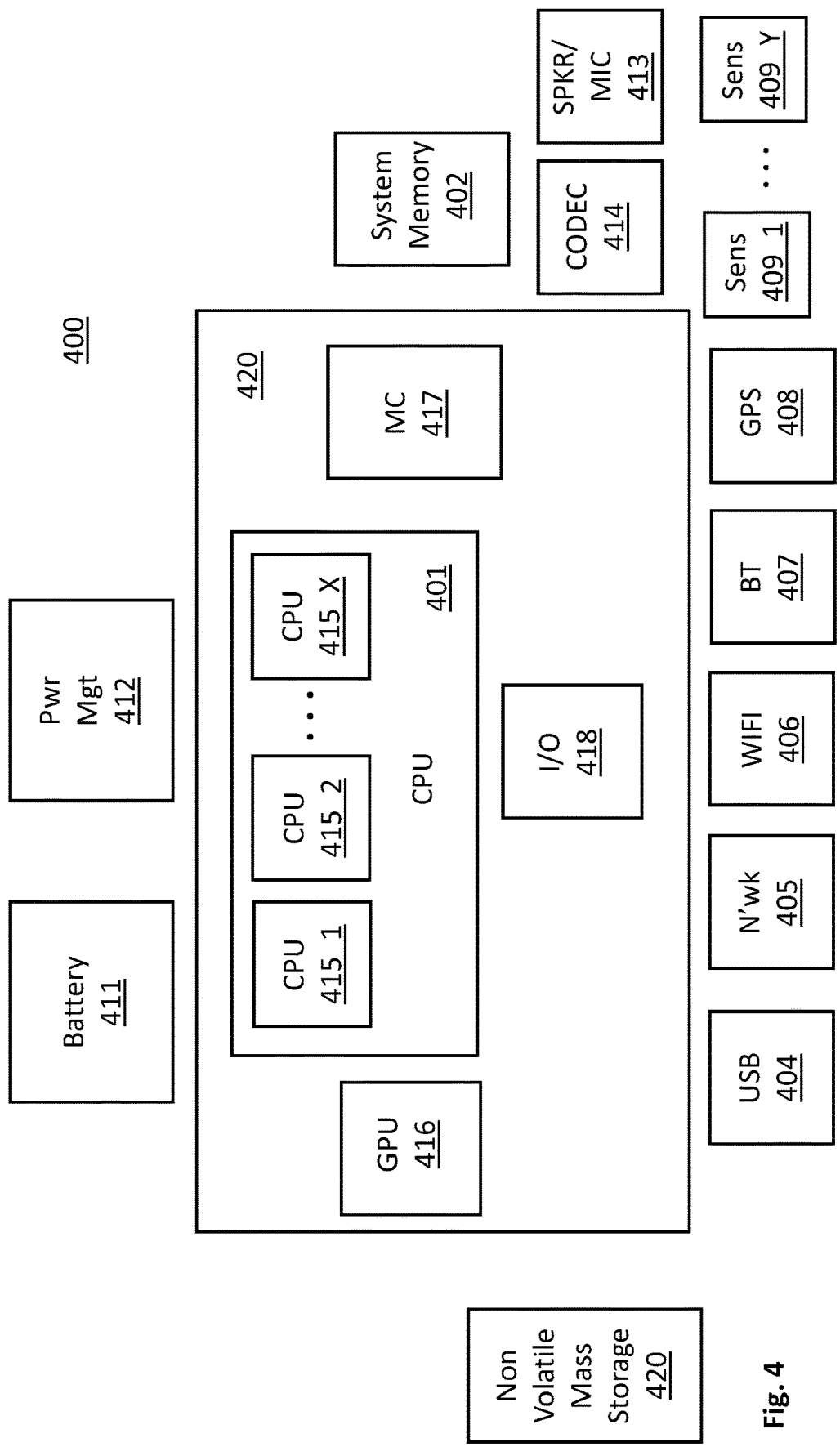
FIG. 4 shows a computing system.

FIG. 4 provides an exemplary depiction of a computing system 400. Any of the aforementioned functions, storage systems and/or cloud services can be constructed, e.g., from networked clusters of computers having at least some of the components described below and/or networked clusters of such components (e.g., a cluster of CPUs communicatively coupled to a cluster of SSDs).

As observed in FIG. 4, the basic computing system 400 may include a central processing unit (CPU) 401 (which may include, e.g., a plurality of general purpose processing cores 415_1 through 415_X) and a main memory controller 417 disposed on a multi-core processor or applications processor, main memory 402 (also referred to as "system memory"), a display 403 (e.g., touchscreen, flat-panel), a local wired point-to-point link (e.g., universal serial bus (USB)) interface 404, a peripheral control hub (PCH) 418; various network I/O functions 405 (such as an Ethernet interface and/or cellular modem subsystem), a wireless local area network (e.g., WiFi) interface 406, a wireless point-to-point link (e.g., Bluetooth) interface 407 and a Global Positioning System interface 408, various sensors 409_1 through 409_Y, one or more cameras 410, a battery 411, a power management control unit 412, a speaker and microphone 413 and an audio coder/decoder 414.

An applications processor or multi-core processor 450 may include one or more general purpose processing cores 415 within its CPU 401, one or more graphical processing units 416, a main memory controller 417 and a peripheral control hub (PCH) 418 (also referred to as I/O controller and the like). The general purpose processing cores 415 typically execute the operating system and application software of the computing system. The graphics processing unit 416 typically executes graphics intensive functions to, e.g., generate graphics information that is presented on the display 403. The main memory controller 417 interfaces with the main memory 402 to write/read data to/from main memory 402. The power management control unit 412 generally controls the power consumption of the system 400. The peripheral control hub 418 manages communications between the computer's processors and memory and the I/O (peripheral) devices.

Each of the touchscreen display 403, the communication interfaces 404-407, the GPS interface 408, the sensors 409, the camera(s) 410, and the speaker/microphone codec 413, 414 all can be viewed as various forms of I/O (input and/or output) relative to the overall computing system including, where appropriate, an integrated peripheral device as well (e.g., the one or more cameras 410). Depending on implementation, various ones of these I/O components may be integrated on the applications processor/multi-core processor 450 or may be located off the die or outside the package of the applications processor/multi-core processor 450. The computing system also includes non-volatile mass storage 420 which may be the mass storage component of the system which may be composed of one or more non-volatile mass storage devices (e.g. hard disk drive, solid state drive, etc.).

The non-volatile mass storage 420 may be implemented with any of solid state drives (SSDs), hard disk drive (HDDs), etc.

Embodiments of the invention may include various processes as set forth above. The processes may be embodied in program code (e.g., machine-executable instructions). The program code, when processed, causes a general-purpose or special-purpose processor to perform the program code's processes. Alternatively, these processes may be performed by specific/custom hardware components that contain hard wired interconnected logic circuitry (e.g., application specific integrated circuit (ASIC) logic circuitry) or programmable logic circuitry (e.g., field programmable gate array (FPGA) logic circuitry, programmable logic device (PLD) logic circuitry) for performing the processes, or by any combination of program code and logic circuitry.

Elements of the present invention may also be provided as a machine-readable medium for storing the program code. The machine-readable medium can include, but is not limited to, floppy diskettes, optical disks, CD-ROMs, and magneto-optical disks, FLASH memory, ROMs, RAMs, EPROMs, EEPROMs, magnetic or optical cards or other type of media/machine-readable medium suitable for storing electronic instructions.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

The invention claimed is:

1. A method, comprising:
   queuing an entry in a queue that identifies an inode that has been changed in an active storage system, the entry further describing a time in the future when the entry is to be processed;
   processing the entry upon the time in the future being reached, the processing of the entry comprising comparing respective content values maintained for different regions of the inode within the active storage system and a replicate storage system;
   comparing content of those of the regions having different content values as between the active storage system and the replicate storage system; and,
   updating those regions in the replicate storage system to reflect those regions within the active storage system based on the comparing, and, updating the respective content values of those regions in the replicate storage system.

2. The method of claim 1 wherein the time in the future is dynamically changeable.

3. The method of claim 1 wherein the time in the future is configured specifically for the region.

4. The method of claim 1 wherein the time in the future is configured specifically for the replicate storage system.

5. The method of claim 1 wherein at least one of the active storage system and the replicate storage system are implemented with a commercially available cloud service.

6. The method of claim 1 wherein the active storage system and the replicate storage system are implemented with different commercially available cloud services.

7. The method of claim 1 wherein the processing further includes processing entries that identify the inode and that where entered in the queue after the entry and before the time in the future is reached.

8. The method of claim 1 further comprising updating the region's replicate storage system content value with the region's active storage system content value.

9. The method of claim 1 wherein the queue is able to have entries for other inodes upon the time in the future being reached.

10. The method of claim 1 wherein the time in the future is dynamically changeable.

11. The method of claim 1 wherein the time in the future is configured specifically for the region.

12. The method of claim 1 wherein the time in the future is configured specifically for the replicate storage system.

13. The method of claim 1 wherein at least one of the active storage system and the replicate storage system are implemented with a commercially available cloud service.

14. The method of claim 3 wherein the entries are not processed upon the time in the future being reached.

15. One or more non-transitory machine readable storage mediums containing program code to be processed by one or more processors so that a method is performed, the method comprising:
   queuing an entry in a queue that identifies an inode that has been changed in an active storage system, the entry further describing a time in the future when the entry is to be processed;
   processing the entry upon the time in the future being reached, the processing of the entry comprising comparing respective content values maintained for different regions of the inode within the active storage system and a replicate storage system;
   comparing content of those of the regions having different content values as between the active storage system and the replicate storage system; and,
   updating those regions in the replicate storage system to reflect those regions within the active storage system based on the comparing, and, updating the respective content values of those regions in the replicate storage system.

16. The one or more machine non-transitory readable storage mediums of claim 15 wherein the time in the future is dynamically changeable.

17. The one or more non-transitory machine readable storage mediums of claim 15 wherein the time in the future is configurable specifically for the region.

18. The one or more non-transitory machine readable storage mediums of claim 15 wherein the time in the future is configurable specifically for the replicate storage system.

19. The one or more non-transitory machine readable storage mediums of claim 15 wherein at least one of the active storage system and the replicate storage system are implemented with a commercially available cloud service.

20. The one or more non-transitory machine readable storage mediums of claim 15 wherein the active storage system and the replicate storage system are implemented with different commercially available cloud services.

21. The one or more non-transitory machine readable storage mediums of claim 15 wherein the processing further includes processing entries that identify the inode and that where entered in the queue after the entry and before the time in the future is reached.

22. One or more computing systems having respective processors to execute program code stored on one or more storage mediums so that a method is performed, the method comprising:

queuing an entry in a queue that identifies an inode that has been changed in an active storage system, the entry further describing a time in the future when the entry is to be processed;

processing the entry upon the time in the future being reached, the processing of the entry comprising comparing respective content values maintained for different regions of the inode within the active storage system and a replicate storage system;

comparing content of those of the regions having different content values as between the active storage system and the replicate storage system; and, updating those regions in the replicate storage system to reflect those regions within the active storage system based on the comparing, and, updating the respective content values of those regions in the replicate storage system.

23. The one or more computing systems of claim 22 wherein the time in the future is dynamically changeable.

24. The one or more computing systems of claim 22 wherein the time in the future is configurable specifically for the region.

25. The one or more computing systems of claim 22 wherein the time in the future is configurable specifically for the replicate storage system.

26. The one or more computing systems of claim 22 wherein at least one of the active storage system and the replicate storage system are implemented with a commercially available cloud service.

27. The one or more computing systems of claim 22 wherein the active storage system and the replicate storage system are implemented with different commercially available cloud services.

28. A method, comprising:

queuing an entry in a queue that identifies an inode that has been changed in an active storage system, the entry further describing a time in the future when the entry is to be processed;

processing the entry upon the time in the future being reached, the processing of the entry comprising comparing respective content values maintained for different regions of the inode within the active storage system and a replicate storage system; and, updating a region of the inode in the replicate storage system with the region's content in the active storage system as a consequence of the region's active and replicate storage system content values being different.

29. One or more non-transitory machine readable storage mediums containing program code to be processed by one or more processors so that a method is performed, the method comprising:

queuing an entry in a queue that identifies an inode that has been changed in an active storage system, the entry further describing a time in the future when the entry is to be processed;

processing the entry upon the time in the future being reached, the processing of the entry comprising comparing respective content values maintained for different regions of the inode within the active storage system and a replicate storage system; and, updating a region of the inode in the replicate storage system with the region's content in the active storage system as a consequence of the region's active and replicate storage system content values being different.

30. The one or more non-transitory machine readable storage mediums of claim 29 wherein the method further comprises updating the region's replicate storage system content value with the region's active storage system content value.

31. The one or more non-transitory machine readable storage mediums of claim 29 wherein the queue is able to have entries for other inodes upon the time in the future being reached.

32. The one or more non-transitory machine readable storage mediums of claim 29 wherein the time in the future is dynamically changeable.

33. The one or more non-transitory machine readable storage mediums of claim 29 wherein the time in the future is configurable specifically for the region.

\* \* \* \* \*